(12) United States Patent
Mitani et al.

(10) Patent No.: US 11,919,664 B2
(45) Date of Patent: Mar. 5, 2024

(54) REACTION WHEEL APPARATUS

(71) Applicant: Japan Aerospace Exploration Agency, Tokyo (JP)

(72) Inventors: Shinji Mitani, Tsukuba (JP); Shuhei Shigeto, Chofu (JP)

(73) Assignee: Japan Aerospace Exploration Agency, Tokyo (JP)

(*) Notice: Subject to any disclaimer, the term of this patent is extended or adjusted under 35 U.S.C. 154(b) by 1238 days.

(21) Appl. No.: 16/321,372

(22) PCT Filed: Jul. 24, 2017

(86) PCT No.: PCT/JP2017/026680
§ 371 (c)(1),
(2) Date: Jan. 28, 2019

(87) PCT Pub. No.: WO2018/021236
PCT Pub. Date: Feb. 1, 2018

(65) Prior Publication Data
US 2019/0168893 A1  Jun. 6, 2019

(30) Foreign Application Priority Data

Jul. 29, 2016 (JP) ................. 2016-150484
Jul. 29, 2016 (JP) ................. 2016-150485

(51) Int. Cl.
*B64G 1/28* (2006.01)
*B64G 1/24* (2006.01)
(Continued)

(52) U.S. Cl.
CPC ............. *B64G 1/283* (2013.01); *B64G 1/244* (2019.05); *B64G 1/28* (2013.01); *G01P 3/487* (2013.01);
(Continued)

(58) Field of Classification Search
None
See application file for complete search history.

(56) References Cited

U.S. PATENT DOCUMENTS 5,873,285 A * 2/1999 Barnes .................. H02K 11/33
74/572.21
6,515,221 B1* 2/2003 Varga ...................... B64G 1/54
244/165
(Continued)

FOREIGN PATENT DOCUMENTS

JP    2017-017807 A    1/2017

OTHER PUBLICATIONS

Written Opinion of the International Searching Authority issued in PCT/JP2017/026680; dated Oct. 17, 2017.
(Continued)

*Primary Examiner* — Todd Melton
*Assistant Examiner* — Jason R Roberson
(74) *Attorney, Agent, or Firm* — Studebaker & Brackett PC

(57) ABSTRACT

A reaction wheel apparatus including a reaction wheel provided in a polyhedral housing, in which respective faces constituting a polyhedron are constituted by frame parts corresponding to the respective faces constituting the polyhedron, and at least two of the frame parts are constituted by at least two rigid circuit board parts of a rigid flexible substrate.

9 Claims, 15 Drawing Sheets

(51) Int. Cl.
  *G01P 3/487* (2006.01)
  *G05D 1/08* (2006.01)
  *H02K 5/00* (2006.01)
  *H02K 5/04* (2006.01)
  *H02K 7/02* (2006.01)
  *H02K 11/30* (2016.01)
  *H02K 11/33* (2016.01)
(52) U.S. Cl.
  CPC ............... *H02K 5/00* (2013.01); *H02K 5/04* (2013.01); *H02K 7/02* (2013.01); *H02K 11/30* (2016.01); *H02K 11/33* (2016.01); *Y02E 60/16* (2013.01)

(56) References Cited

U.S. PATENT DOCUMENTS

2015/0210408 A1* 7/2015 Dunn ................... B64G 1/10
                                                      244/159.4
2017/0327253 A1* 11/2017 Bogdanov ............. B64G 1/645
2018/0346155 A1* 12/2018 Spangelo ............... B64G 1/425

OTHER PUBLICATIONS

International Search Report issued in PCT/JP2017/026680; dated Oct. 17, 2017.

* cited by examiner

| | ROTOR ROTATION PHASE ANGLE(°) | | | | | | | | | |
|---|---|---|---|---|---|---|---|---|---|---|
| | 0 | 36 | 72 | 108 | 144 | 180 | 216 | 252 | 288 | 324  360 |
| $HS_1$ | 1 | 1 | 1 | 1 | 1 | 0 | 0 | 0 | 0 | 0 |
| $HS_2$ | 0 | 0 | 1 | 1 | 1 | 1 | 1 | 0 | 0 | 0 |
| $HS_3$ | 0 | 0 | 0 | 0 | 1 | 1 | 1 | 1 | 1 | 0 |
| SECTION | B11 | | B21 | | B31 | B12 | | B22 | | B32 |
| $HS_1 \oplus HS_2$ | 1 | 1 | 0 | 0 | 0 | 1 | 1 | 0 | 0 | 0 |
| $HS_2 \oplus HS_3$ | 0 | 0 | 1 | 1 | 0 | 0 | 0 | 1 | 1 | 0 |
| $\overline{HS_3 \oplus HS_1}$ | 0 | 0 | 0 | 0 | 1 | 0 | 0 | 0 | 0 | 1 |

| ROTOR ROTATION PHASE ANGLE(°) | | | | | | | | | | |
|---|---|---|---|---|---|---|---|---|---|---|
| | 0 | 36 | 72 | 108 | 144 | 180 | 216 | 252 | 288 | 324 360 |
| $HS_1$ | 1 | 1 | 1 | 1 | 1 | 0 | 0 | 0 | 0 | 0 |
| $HS_2$ | 0 | 0 | 1 | 1 | 1 | 1 | 1 | 0 | 0 | 0 |
| $HS_4$ | 1 | 0 | 0 | 0 | 0 | 0 | 1 | 1 | 1 | 1 |
| SECTION | B11 | B21 | B31 | | | B12 | B22 | B32 | | |
| $\overline{HS_1 \oplus HS_4}$ | 1 | 0 | 0 | 0 | 0 | 1 | 0 | 0 | 0 | 0 |
| $\overline{HS_2 \oplus HS_4}$ | 0 | 1 | 0 | 0 | 0 | 0 | 1 | 0 | 0 | 0 |
| $\overline{HS_1 \oplus HS_2}$ | 0 | 0 | 1 | 1 | 1 | 0 | 0 | 1 | 1 | 1 |

ROTOR ROTATION PHASE ANGLE(°)

| | 0 | 36 | 72 | 108 | 144 | 180 | 216 | 252 | 288 | 324 | 360 |
|---|---|---|---|---|---|---|---|---|---|---|---|
| $HS_1$ | 1 | 1 | 1 | 1 | 1 | 0 | 0 | 0 | 0 | 0 | |
| $HS_2$ | 0 | 0 | 1 | 1 | 1 | 1 | 1 | 0 | 0 | 0 | |
| $HS_3$ | 0 | 0 | 0 | 0 | 1 | 1 | 1 | 1 | 1 | 0 | |
| $HS_4$ | 1 | 0 | 0 | 0 | 0 | 0 | 1 | 1 | 1 | 1 | |
| SECTION | B11 | B21 | B31 | | B41 | B12 | B22 | B32 | | B42 | |

| | | | | | | | | | | |
|---|---|---|---|---|---|---|---|---|---|---|
| $HS_1 \oplus HS_4$ | 1 | 0 | 0 | 0 | 0 | 1 | 0 | 0 | 0 | 0 |
| $HS_2 \oplus HS_4$ | 0 | 1 | 0 | 0 | 0 | 0 | 1 | 0 | 0 | 0 |
| $HS_2 \oplus HS_3$ | 0 | 0 | 1 | 1 | 0 | 0 | 0 | 1 | 1 | 0 |
| $HS_3 \oplus HS_1$ | 0 | 0 | 0 | 0 | 1 | 0 | 0 | 0 | 0 | 1 |

FIG.22

ROTOR ROTATION PHASE ANGLE(°)

| | 0° | 60° | 120° | 180° | 240° | 300° | 360°(=0°) |
|---|---|---|---|---|---|---|---|
| Hu | 1 | 1 | 1 | 0 | 0 | 0 | |
| Hv | 0 | 0 | 1 | 1 | 1 | 0 | |
| Hw | 1 | 0 | 0 | 0 | 1 | 1 | |
| SECTION | B1 | B2 | B3 | B4 | B5 | B6 | |

FIG.23

ROTOR ROTATION PHASE ANGLE(°)

| | 0° | 60° | 120° | 180° | 240° | 300° | 360°(=0°) |
|---|---|---|---|---|---|---|---|
| Hu | 1 | 1 | 1 | 0 | 0 | 0 | |
| Hv | 0 | 0 | 1 | 1 | 1 | 0 | |
| SECTION | B1' | | B2' | B3' | | B4' | |

REACTION WHEEL APPARATUS

TECHNICAL FIELD

The present invention relates to a reaction wheel apparatus.

BACKGROUND ART

Compact attitude control modules incorporating reaction wheels have been studied as attitude control modules for compact satellites and as compact modular robots. These modules are equipped with motors, inertia wheels, control circuits, and the like to generate the rotational torque necessary for the attitude control of satellites, robots, and the like.

These compact attitude control modules are required to further downsize, and therefore the present inventors have proposed a triaxial reaction wheel apparatus whose size is not larger than 10 cm$^3$ (refer to Patent Literature 1).

PRIOR ART LITERATURE

Patent Literature

Patent Literature 1: Japanese Patent Application No. 2015-130133

SUMMARY OF INVENTION

Problem to be Solved by Invention

Although the present inventors have realized the triaxial reaction wheel apparatus whose size is not larger than 10 cm$^3$ as mentioned above, further miniaturization of the compact attitude control modules is required.

In view of the above, the present invention intends to provide a further compact reaction wheel apparatus.

Means for Solving Problem

One aspect of the present invention provides a reaction wheel apparatus that is a reaction wheel apparatus including a reaction wheel provided in a polyhedral housing, in which respective faces constituting a polyhedron are constituted by frame parts corresponding to the respective faces constituting the polyhedron, and at least two of the frame parts are constituted by at least two rigid circuit board parts of a rigid flexible substrate.

The rigid flexible substrate may include a first rigid circuit board part. The first rigid circuit board part of the rigid flexible substrate may have a first through opening penetrating in the thickness direction of the first rigid circuit board part. The first through opening may have a nut accommodation part extending substantially parallel to a side edge of the first rigid circuit board part and a screw accommodation part that opens to the side edge of the first rigid circuit board part and extends orthogonally to the nut accommodation part. A nut may be accommodated in the nut accommodation part. At least one first frame part neighboring the first rigid circuit board part may have a through hole at a position aligned with the screw accommodation part of the first through opening of the first rigid circuit board part and the nut accommodated in the nut accommodation part. And, the at least one first rigid circuit board part and the first frame part may be connected by driving the screw inserted from the outside of the at least one first frame part into the nut through the through hole and the screw accommodation part.

A cutout part opening outward may be formed at a side edge of at least one rigid circuit board part of the rigid flexible substrate. A frame part connected to the side edge formed with the cutout part may be disposed so as to cover an opening edge of the cutout part, in such a way as to form an opening between the frame part connected to the side edge formed with the cutout part and the cutout part. And, a wiring from a component provided inside the housing may be connected to a terminal provided on an outer surface of the at least one rigid circuit board part, through the opening.

A stepped cutout part opening outward may be formed at least one side edge of the rigid flexible substrate where a flexible cable is connected, of at least one rigid circuit board part of the rigid flexible substrate, and the flexible cable may extend from a deeper part of the stepped cutout part.

A connection assist member to which an external device can be connected may be attached to at least one vertex part or side region of the polyhedron.

The reaction wheel may be provided so as to face the frame part.

The reaction wheel may be provided so as to face the frame part other than the frame part constituted by the rigid flexible substrate.

The reaction wheel may include a rotary body disposed so as to face the frame part, an electromagnet disposed between the frame part and the rotary body, and an urging member attached to the frame part and urging the electromagnet toward the frame part. At least a partial portion of the rotary body facing the electromagnet may be formed of a ferromagnetic material. The electromagnet may be urged by the urging member in such a manner that the electromagnet and the rotary body are separated from each other when the electromagnet is not energized, and the electromagnet may come into contact with the rotary body against an urging force of the urging member when the electromagnet is energized, thereby braking the rotary body.

A motor for rotating the rotary body may be disposed between the rotary body and the frame part, and a wiring from the motor may be drawn out between the urging member and the frame part.

The polyhedron may be a hexahedron.

The component provided inside the housing may be an electromagnet of the reaction wheel.

Advantageous Effect of Invention

According to the present invention having the above-mentioned configurations, a further compact reaction wheel apparatus can be provided.

BRIEF DESCRIPTION OF DRAWINGS

FIG. 22 is a diagram illustrating values of the output signals Hu, Hv, and Hw of the Hall sensor $HS_1$, $HS_2$, and $HS_3$ with respect to the rotation phase angle of the rotor.

FIG. 23 is a diagram illustrating values of the output signals Hu and Hv of the Hall sensors with respect to the rotor rotation phase angle.

DESCRIPTION OF EMBODIMENTS

Hereinafter, embodiments of a reaction wheel apparatus according to the present invention will be described with reference to drawings.

<Reaction Wheel Apparatus>

First Embodiment

Figure 1:
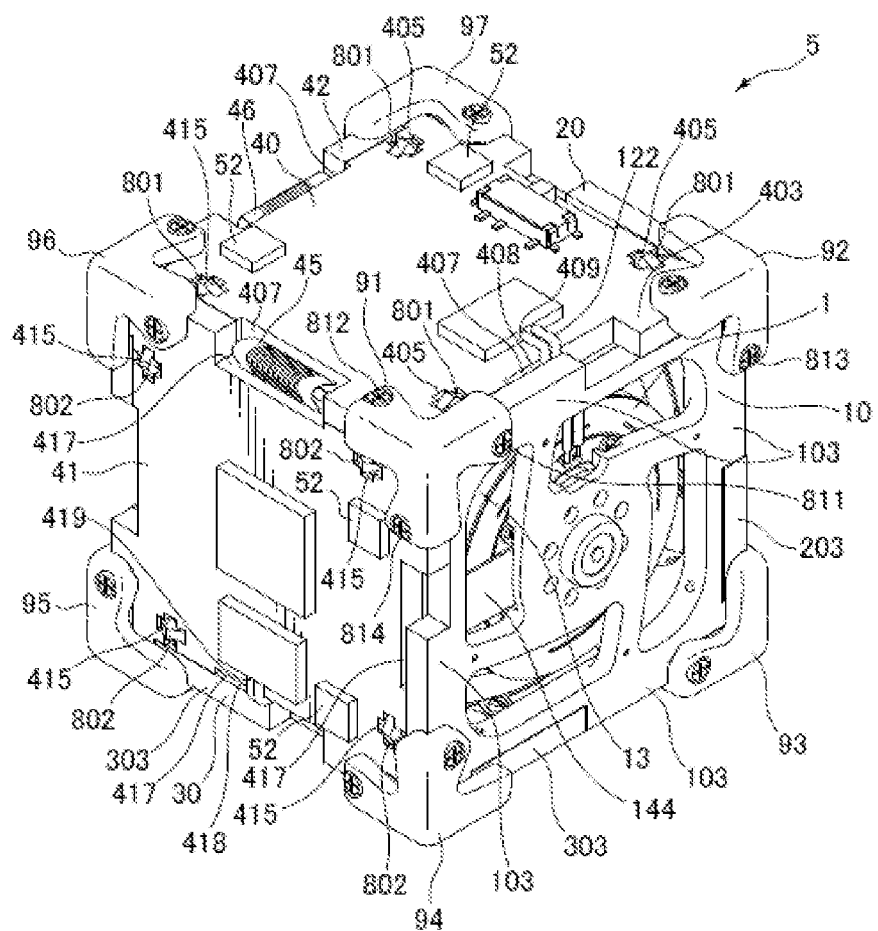
FIG. 1 is a perspective view illustrating a reaction wheel apparatus according to a first embodiment of the present invention.
Figure 2:
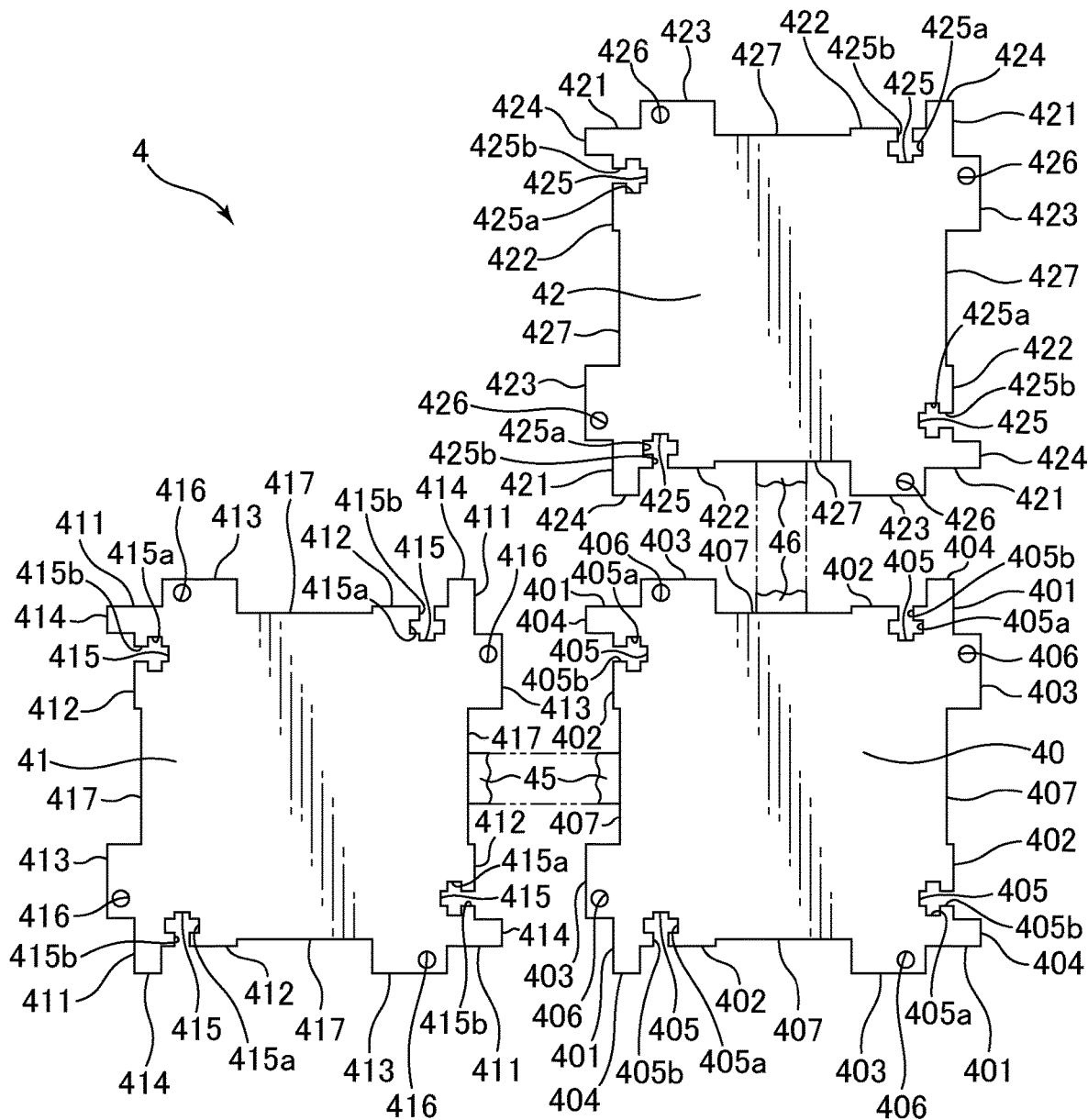
FIG. 2 is a plan view illustrating a rigid flexible substrate that can be used in the reaction wheel apparatus according to the first embodiment of the present invention.
Figure 3:
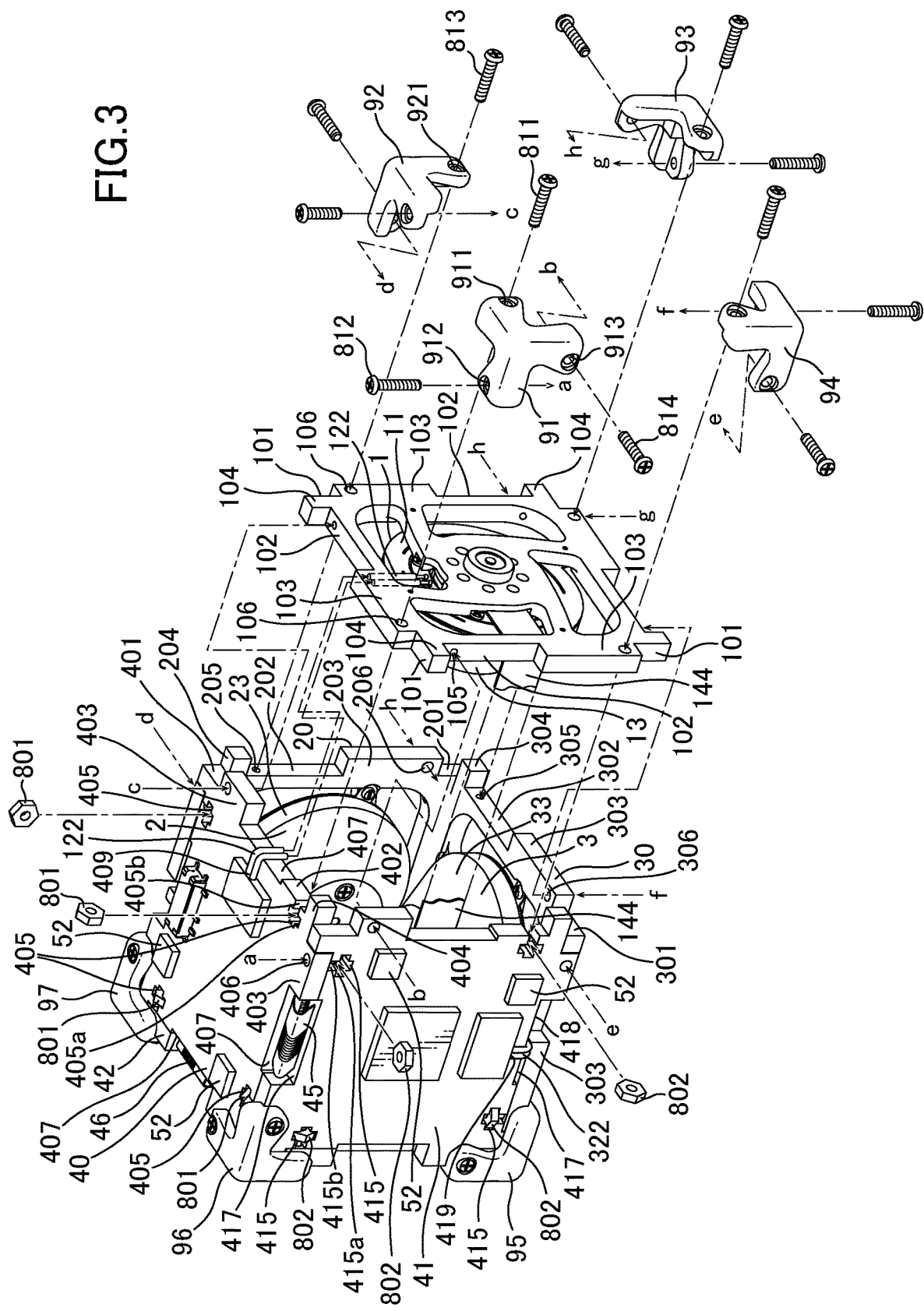
FIG. 3 is an exploded perspective view illustrating the reaction wheel apparatus according to the first embodiment of the present invention.

FIG. 1 is a perspective view illustrating a reaction wheel apparatus according to the first embodiment of the present invention. FIG. 2 is a plan view illustrating a rigid flexible substrate that can be used in the reaction wheel apparatus according to the first embodiment of the present invention. FIG. 3 is an exploded perspective view illustrating the reaction wheel apparatus according to the first embodiment of the present invention.

A reaction wheel apparatus 5 has a cubic (regular hexahedral) shape. A cube has respective faces that are constituted by frame parts corresponding to the respective faces. The frame parts are mutually connected to constitute a housing of the reaction wheel apparatus 5. The shape of the reaction wheel apparatus may be any appropriate polyhedron shape.

The reaction wheel apparatus 5 includes three reaction wheels 1, 2, and 3. The reaction wheels 1, 2, and 3 are disposed in such a manner that directions of rotational axes of flywheels 13, 23, and 33 (described below) of the reaction wheels 1, 2, and 3 are mutually orthogonal. As a result, the angular momentum can be generated with respect to three orthogonal axes. Frames 10, 20, and 30 of respective reaction wheels, each having the same substantially square shape, constitute three of six frame parts of the reaction wheel apparatus 5.

Rigid circuit board parts 40, 41, and 42 of a rigid flexible substrate 4 described below constitute the remaining three of the frame parts of the reaction wheel apparatus 5.

The frames 10, 20, and 30 and the rigid circuit board parts 40, 41, and 42 are mutually connected in such a manner that the reaction wheel apparatus 5 has a cubic shape as a whole, as described in detail below.

As illustrated in FIG. 2, the rigid flexible substrate 4 includes the rigid circuit board parts 40, 41, and 42, a flexible cable 45 connecting the rigid circuit board part 40 and the rigid circuit board part 41, and a flexible cable 46 connecting the rigid circuit board part 40 and the rigid circuit board part 42.

The rigid flexible substrate 4 is provided with circuit elements such as circuit elements constituting a control unit, and other circuit elements including MEMS sensor inertial measurement units (IMUs) 52.

The control unit controls the rotational state of respective flywheels 13, 23, and 33 by controlling respective motors 14, 24, and 34 of the reaction wheels 1, 2, and 3 and the excitation current supplied to each of electromagnets 12, 22, and 32, as described below. Further, the control unit 51 acquires detection information, which includes angular speed and acceleration in each of three axes, from the MEMS sensor IMUs 52, and performs various calculations based on the acquired information and controls the motors 14, 24, and 34, the electromagnets 12, 22, and 32, and the like based on the acquired information and the calculation result.

A plurality of MEMS sensor IMUs 52 is disposed on the rigid circuit board parts, at positions adjacent to respective corners of vertices of the cube. Information from each IMU 52 is transmitted to the control unit. The control unit may determine the gravitational acceleration direction and the like based on this information and control the rotational state of respective flywheels 13, 23, and 33.

The rigid circuit board parts 40, 41, and 42 have the same substantially square shape. When the flexible cables 45 and 46 are bent so that the rigid circuit board parts 40, 41, and 42 are mutually orthogonal, the rigid flexible substrate 4 constitutes three of the faces constituting the cube of the reaction wheel apparatus 5.

In addition, first cutout parts 401, 411, and 421 each being rectangular and opening outward are formed at side edges of the rigid circuit board parts 40, 41, and 42, and second cutout parts 402, 412, and 422 each being rectangular and opening outward are formed so as to be separated from the first cutout parts 401, 411, and 421 by predetermined distances. First residual parts 403, 413, and 423 each being rectangular are formed between the first cutout parts 401, 411, and 421 and the second cutout parts 402, 412, and 422. Second residual parts 404, 414, and 424 each being rectangular are formed on sides of the second cutout parts 402, 412, and 422 opposing the first residual parts 403, 413, and 423.

In addition, at respective corners of the rigid circuit board parts 40, 41, and 42, first through opening 405, 415, and 425 and first through holes 406, 416, and 426 each penetrating in the thickness direction thereof are formed. More specifically, the first residual parts 403, 413, and 423 are formed with the first through holes 406, 416, and 426 on the corner sides of the rigid circuit board parts 40, 41, and 42. The first through openings 405, 415, and 425 are formed on the second residual parts 404, 414, and 424 sides of the second cutout parts 402, 412, and 422. The first through openings 405, 415, and 425 have nut accommodation parts 405a, 415a, and 425a extending substantially parallel to the side edges of the rigid circuit board parts 40, 41, and 42, more specifically, bottom lines of the second cutout parts 402, 412, and 422, and screw accommodation parts 405b, 415b, and 425b opening to the second cutout parts 402, 412, and 422 being the side edges of the rigid circuit board parts 40, 41, and 42 and extending orthogonally to the nut accommodation parts 405a, 415a, and 425a. The sectional shape of respective first through openings 405, 415, and 425 transversal with respect to the thickness direction of the rigid circuit board parts 40, 41, and 42 is cruciform in the present embodiment, although it may be T shape. A nut 801 is fitted into each of the nut accommodation parts 405a, 415a, and 425a. The nut 801 may be configured so as to leave a gap in each of the nut accommodation parts 405a, 415a, and 425a when accommodated, instead of being fitted into the nut accommodation parts 405a, 415a, and 425a.

The frames 10, 20, and 30 of the reaction wheels 1, 2, and 3 are substantially square in shape, as mentioned above. Third cutout parts 101, 201, and 301, each being rectangular and opening outward, are formed at side edges of the frames 10, 20, and 30. Fourth cutout parts 102, 202, and 302, each being rectangular and opening outward, are formed so as to be separated from the third cutout parts 101, 201, and 301 by predetermined distances. Third residual parts 103, 203, and 303 each being rectangular are formed between the third cutout parts 101, 201, and 301 and the fourth cutout parts 102, 202, and 302. Fourth residual parts 104, 204, and 304 each being rectangular are formed on sides of the fourth cutout parts 102, 202, and 302 opposing the third residual parts 103, 203, and 303.

In addition, at respective corners of the frame 10, second through holes 106, 206, and 306 each penetrating in the thickness direction thereof are formed. More specifically, the third residual parts 103, 203, and 303 are formed with the second through holes 106, 206, and 306 on the corner sides of the frames 10, 20, and 30. Further, the fourth cutout parts 102, 202, and 302 have bottom surfaces provided with female screw parts 105, 205, and 305, on the fourth residual parts 104, 204, and 304 sides.

The cutout parts and the residual parts formed on respective rigid circuit board parts 40, 41, and 42 and the cutout parts and the residual parts formed on the frames 10, 20, and 30 of the reaction wheel are fitted with each other.

Side edges of the rigid circuit board parts 40, 41, and 42 and the side edges of the frames 10, 20, and 30 may have any appropriate shape such as a linear shape.

The frame 10, which is a frame part neighboring the rigid circuit board part 40, has the second through hole 106 at a position aligned with the screw accommodation part 405b of the first through opening 405 of the rigid circuit board part 40, the nut 801 accommodated in the nut accommodation parts 405a, and a screw hole 911 of a connection assist member 91. Accordingly, by driving a screw 811 inserted from the outside of the frame 10 into the nut 801 through the screw hole 911 of the connection assist member 91, the second through hole 106, and the screw accommodation part 405b, the rigid circuit board part 40 and the frame 10 can be connected with each other.

Similarly, the rigid circuit board part 40, which is a frame part neighboring the rigid circuit board part 41, has a first through hole 406 at a position aligned with the screw accommodation part 415b of the first through opening 415 of the rigid circuit board part 41, a nut 802 fitted into the nut accommodation part 415a, and a screw hole 912 of the connection assist member 91. Accordingly, by driving a screw 812 inserted from the outside of the rigid circuit board part 40 into the nut 802 through the screw hole 912 of the connection assist member 91, the first through hole 406, and the screw accommodation part 415b, the rigid circuit board part 40 and the rigid circuit board part 41 are connected with each other.

The frame 10, which is a frame part neighboring the frame 20, has the second through hole 106 at a position aligned with the female screw part 205 of the frame 20 and a screw hole 921 of a connection assist member 92. Accordingly, by driving a screw 813 inserted from the outside of the frame 10 into the female screw part 205 through the screw hole 921 of the connection assist member 92 and the second through hole 106, the frame 20 and the frame 10 are connected with each other.

Further, by driving a screw 814 inserted from the outside of the rigid circuit board part 41 into the female screw part 105 of the frame 10 through a screw hole 913 of the connection assist member 91 and the first through hole 416 of the rigid circuit board part 41, the frame 10 and the rigid circuit board part 41 are connected with each other.

Similar structures are employed for connection between other rigid substrate and the rigid circuit board part, between the rigid circuit board part and a neighboring frame, and between two frames.

According to such a connection structure, the rigid circuit board part itself can be used as a frame part. More specifically, since the rigid circuit board part is very small in thickness and is therefore fragile in a direction perpendicular to a side edge surface thereof, it is difficult to form a screw hole opening on the side edge surface and therefore the side edge surface could not be used as a connection surface to be connected to a neighboring frame part. However, with the above-mentioned connection structure, the side edge surface can be used as a surface for connection to a neighboring frame part. Therefore, the rigid circuit board part itself can be used as a frame part.

The above-mentioned connection structure, more specifically the connection structure in which a plate-like first member has a first through opening penetrating in the thickness direction of the first member, the first through opening has a nut accommodation part extending substantially parallel to a side edge of the first member and a screw accommodation part opening to the side edge of the first member and extending orthogonally to the nut accommodation part, a nut is accommodated in the nut accommodation part, the second member has a through hole at a position aligned with the screw accommodation part of the first through opening of the first member and the nut accommodated in the nut accommodation part, and the first member and the second member are connected with each other by driving a screw inserted from the outside of the first member into the nut through the through hole and the screw accommodation part, is not limited to connection structure between a rigid circuit board part and other frame part, but may be generally employed for connecting a plate-like member to other member by using a side edge surface of the plate-like member as a connection surface.

According to the present embodiment, since the rigid circuit board part itself can be used as a frame part, the entire volume of the circuit elements occupying the inside of the housing of the reaction wheel apparatus can be remarkably reduced and accordingly the apparatus can be further downsized.

Further, the second cutout parts 402, 412, and 422 of the rigid circuit board parts 40, 41, and 42 include fifth cutout parts 407, 417, and 427 each being rectangular and opening outward are formed on the first residual parts 403, 413, and 423 sides, so as to form stepped cutout parts as a whole. The third residual parts 103, 303, and 203 of the frames 10, 30, and 20, which are frame parts connected to the second cutout parts 402, 412, and 422 respectively serving as side edges along which the fifth cutout parts 407, 417, and 427 are formed, are disposed so as to cover the opening edges of the fifth cutout parts 407, 417, and 427, thereby forming openings 408, 418, and 428. A wiring 122 from an electromagnet 12 of a reaction wheel 1, which is a component provided inside the housing of the reaction wheel apparatus 5, is connected to a terminal 409 provided on an outer surface of the rigid circuit board part 40 through the opening 408. Similarly, wirings from electromagnets 22 and 33 of reaction wheels 2 and 3 are connected to terminals 429 and 419 provided on outer surfaces of the rigid circuit board parts 42 and 41 through the openings 428 and 418.

According to the above-mentioned configuration, since the wirings from the components provided inside the housing can be connected to the terminals provided on the outer surfaces of the rigid circuit board parts through the openings, it is possible to mount the circuit elements on the outer substrate surfaces of the rigid circuit board parts. As a result, the entire volume of the circuit elements occupying the inside of the housing of the reaction wheel apparatus can be further reduced. The maintenance of the circuits becomes easy. In addition, assembling and disassembling of the reaction wheel apparatus become realistically feasible.

In general, a large force acts on a flexible cable when the bending radius is small. However, adopting the above-mentioned configuration in which the flexible cable extends from the fifth cutout part, which is a deeper part of the stepped cutout part, can lengthen not only the flexible cable itself but also the distance between the parts to which the flexible cables attached, thereby relieving the force applied to the flexible cable.

Figure 4:
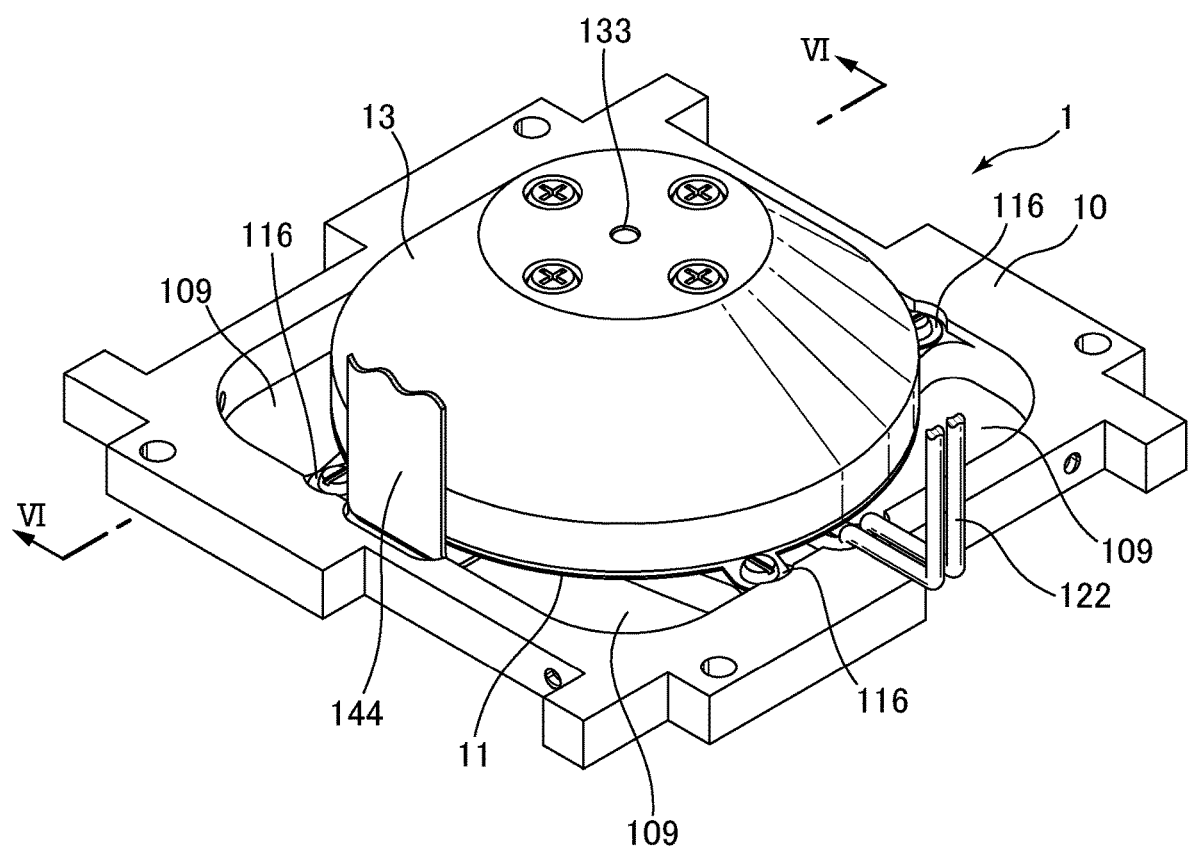
FIG. 4 is a perspective view illustrating a reaction wheel according to the first embodiment of the present invention.
Figure 5:
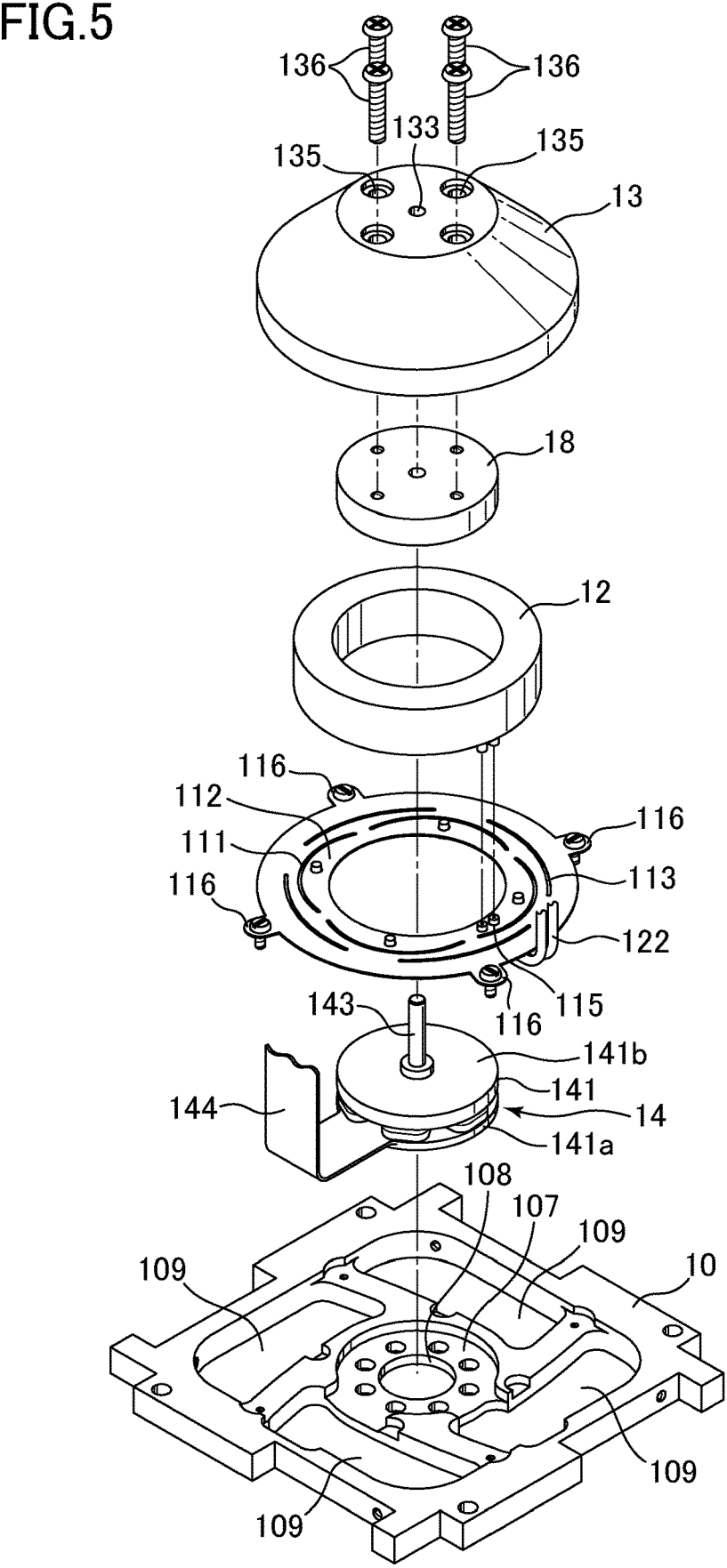
FIG. 5 is an exploded perspective view illustrating the reaction wheel according to the first embodiment of the present invention.
Figure 6:
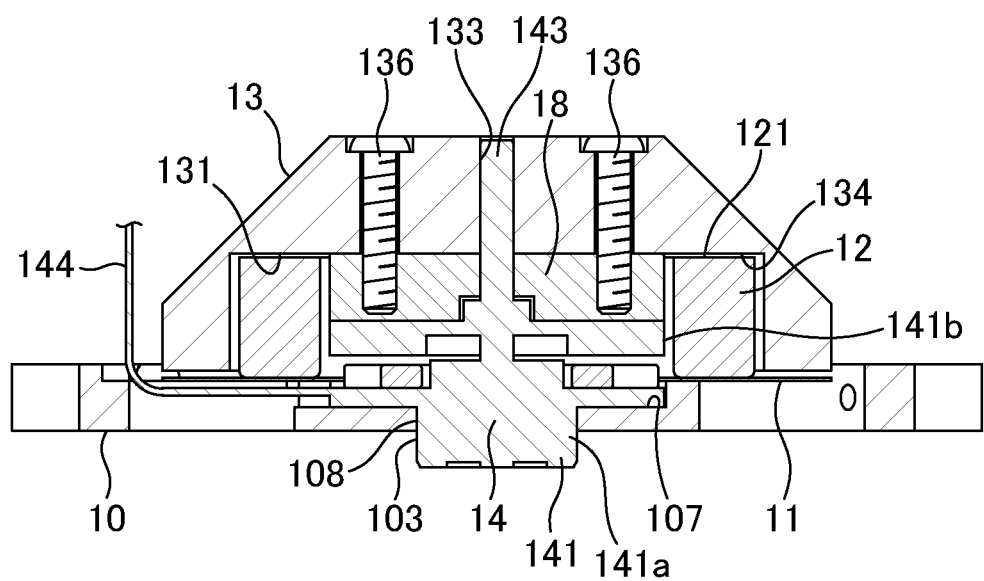
FIG. 6 is a cross-sectional view taken along a line VI-VI in FIG. 4.

Subsequently, the configuration of the reaction wheels 1, 2, and 3 will be described with reference to FIGS. 4 to 6. FIG. 4 is a perspective view illustrating the reaction wheel according to the present embodiment. FIG. 5 is an exploded perspective view illustrating the reaction wheel according to the present embodiment. FIG. 6 is a cross-sectional view taken along a line VI-VI in FIG. 4.

As illustrated in FIGS. 4 to 6, the reaction wheel 1 according to the present embodiment includes the frame 10, a leaf spring 11 serving as an urging member, the electromagnet 12, the flywheel 13 serving as a rotary body, and the motor 14.

The frame 10 has a substantially square shape, as mentioned above, and cutout parts and residual parts are respectively formed at side edges thereof. The frame 10 is formed with four openings 109 each penetrating in the thickness direction. By adopting the frame configured to include openings as mentioned above, it is possible to reduce the weight of the frame. Alternatively, the frame may be configured as a plate-like member having no opening. The number of openings and the shape of each opening may be appropriately determined. A circular recessed part 107 is formed at the center of the frame 10. The opening 108 penetrating in the thickness direction is provided at the center of the recessed part 107.

The motor 14 includes a motor body 141 and a shaft 143, and rotates the flywheel 13 (described below) attached to the motor body 141 via a connection member 18. The motor body 141 includes a substantially cylindrical stator part 141a having a flange and a disk-shaped rotor part 141b having a cylindrical protrusion protruding toward the center in the axial direction. When the stator part 141a is fitted into and bonded to the recessed part 107 and the opening 108 of the frame 10, the motor 14 can be fixed to the frame 10.

The flywheel 13 has a substantially truncated conical shape, and a peripheral portion thereof has an annular surface parallel to the axis of rotation. The flywheel 13 is formed of a ferromagnetic material. A recessed part 131 that can accommodate the electromagnet 12 is formed on a side of the flywheel 13 facing the electromagnet 12, and a surface of the recessed part 131 facing the electromagnet is a plane. A hole 133 for passing the shaft 143 of the motor 14 is provided at the center of the flywheel 13. By driving screws 136 through screw holes 135 formed at the top of the flywheel 13, the cylindrical connection member 18 is fixed to the surface of the recessed part 131 facing the electromagnet. A surface of the connection member 18 positioned on the side of the frame 10 and the rotor part 141b of the motor 14 are fixed by means of an adhesive.

Although the flywheel 13 and the connection member 18 can be integrally formed, adopting the configuration forming them as separate members is useful in that a shim thin material can be inserted between the flywheel 13 and the connection member 18. As a result, the size of the gap between the electromagnet 12 and the flywheel 13 can be adjusted so as to prevent the electromagnet 12 and the flywheel 13 from being positioned too closely or too far when the electromagnet 12 is not energized.

When the motor is disposed on the upper side, a cantilever structure or a two-support beam structure for supporting the motor is required and the shape of the flywheel cannot be formed into a substantially truncated cone. As mentioned above, when the motor is disposed on the frame side and the shape of the flywheel is a substantially truncated conical shape, neighboring reaction wheels can be positioned closely and the apparatus can be further downsized.

The leaf spring 11 has a disc-like shape having a circular opening at the center thereof. The leaf spring 11 has four arc-shaped first slits 111 each being convex in a radially outer direction, which are provided on an inner circumferential side of the leaf spring 11 at an angular interval of 90° in the circumferential direction. Each first slit 111 extends so as to penetrate the leaf spring 11 in the thickness direction. In addition, the leaf spring 11 has four arc-shaped second slits 113, which are provided an outer circumferential side of the leaf spring 11 at an angular interval of 90° in the circumferential direction. Each second slit 113 extends so as to penetrate the leaf spring 11 in the thickness direction. The first slits 111 and the second slits 113 are alternately disposed. The leaf spring 11 has four ear parts 116 each extending in a radially outer direction and having a screw hole, which are provided along a circumferential edge thereof at an angular interval of 90° in the circumferential direction. The leaf spring 11 is fixed to the frame 10 by means of screws. As described below, the wiring 122 from the electromagnet and a wiring 144 from the motor 14 extend substantially parallel to the frame. Therefore, in order to prevent interference between the wiring 122 from the electromagnet and the wiring 144 from the motor 14, the ear parts 116 are disposed in such a way as to be offset in the circumferential direction with respect to the wiring 122 from the electromagnet and the wiring 144 from the motor 14. The shape, arrangement, number, and the like of the slits can be determined arbitrarily and appropriately. The shape of the leaf spring can be determined arbitrarily and appropriately, too.

The electromagnet 12 has a ring shape, and its cross section in the radial direction is rectangular. The electromagnet 12 can be partly ring-shaped, that is arc-shaped, and one or more arc-shaped electromagnets 12 may be arranged. The shape of the electromagnet and the cross sectional shape thereof in the radial direction can be determined arbitrarily and appropriately. A surface of the electromagnet 12 facing the frame 10 is fixed to the leaf spring 11 by means of screws, and the leaf spring 11 urges the electromagnet 12 toward the frame 10. More specifically, even when the frame 10 is not disposed vertically below the electromagnet 12, the electromagnet 12 is urged by the leaf spring 11 in such a manner that the electromagnet 12 and the flywheel 13 separate from each other when the electromagnet 12 is not energized, thereby letting the electromagnet 12 be movable in the axial direction. The gap between the electromagnet 12 and the flywheel 13 can be maintained at a predetermined interval. The structure (its shape, shape and number of an elasticity imparting portion, etc.) and the rigidity (material, thickness, etc.) of the leaf spring 11 may be determined by optimizing the relationship between leaf spring deflection due to gravity and attracting magnetic force.

The wiring 122 from the electromagnet 12 is drawn out between the leaf spring 11 and the frame 10 through a hole 115 penetrating in the thickness direction of the leaf spring 11 and is connected to the terminal 409 provided on the outer surface of the rigid circuit board part 40 through the opening 408 as mentioned above.

The wiring 144 from the motor 14 is a flat cable drawn out along a side surface of the stator part of the motor 14. The wiring 144 from the motor 14 is also drawn out between the leaf spring 11 and the frame 10, bend in the vicinity of an outer edge of the leaf spring 11, and connected to a terminal provided on an inner surface of the rigid circuit board part 41. As mentioned above, in the present embodiment, by adopting the configuration in which the leaf spring is interposed between the wiring from the motor and the flywheel, interference between the wiring 144 from the motor 14 and the flywheel 13 can be prevented. In this case, if the outer edge of the leaf spring 11 is located outside the outer edge of the flywheel 13, such an effect can be more surely achieved.

In place of such a configuration, by drawing out the wiring 144 from the motor 14 through the openings 408, 418, and 428 formed by disposing the third residual parts 103, 303, and 203 of the frames 10, 30, and 20, which are the frame parts connected to the second cutout parts 402, 412, and 422, which are side edges at which the above-mentioned fifth cutout parts 407, 417, and 427, so as to cover the opening edges of the fifth cutout parts 407, 417, and 427, interference between the wiring 144 from the motor 14 and the flywheel 13 can be prevented.

In the above-mentioned embodiment, although the wiring 122 from the electromagnet and the wiring 144 from the motor 14 are disposed so as to be orthogonal to each other by 90°, they may be disposed in the same direction or in opposite direction.

In such a configuration, when the electromagnet 12 is energized while the flywheel 13 is rotating, the electromagnetic force by the generated magnetic flux causes the electromagnet 12 to be attracted to and come into contact with the flywheel 13 formed of the ferromagnetic material against the urging force of the leaf spring 11, thereby braking the flywheel 13. Changing the magnitude of the magnetic flux generated by the electromagnet 12 or the change rate of the magnetic flux can control the braking state. Making the magnetic flux of the electromagnet 12 change stepwise and generating a large magnetic force can rapidly stop the rotating flywheel 13. As a result, the reaction wheel 1 can instantaneously set the generating angular momentum to zero.

Rapidly stopping the flywheel 13 with higher responsiveness can be realized by increasing the braking force. One approach is to increase the contact area between the flywheel 13 and the electromagnet 12.

More specifically, a first braking surface 121 that is a surface coming into contact with the flywheel 13 of the electromagnet 12 when the electromagnet 12 is energized and a second braking surface 134 that is a surface coming into contact with the electromagnet 12 of the flywheel 13 may be complementary in shape. In the present embodiment, the first braking surface 121 of the electromagnet 12 and the second braking surface 134 of the flywheel 13 are mutually parallel planes and complementary in shape. As a complementary shape, adopting a shape having a larger contact area between the electromagnet 12 and the flywheel 13, for example, a shape having a circular cross section, can increase the braking force.

Further, when the electromagnet 12 is configured to come into contact with an outer peripheral side of the flywheel 13 at the time of energization of the electromagnet 12, the braking surface can be larger compared to a case where the electromagnet 12 is configured to come into contact with a central side of the flywheel 13. In the present embodiment, by adopting the configuration for causing the electromagnet 12 to come into contact with the outer peripheral portion of the flywheel 13 at the time of energization of the electromagnet 12, the contact area is increased and the braking force is increased.

In the above-mentioned embodiment, the flywheel 13 is entirely formed of the ferromagnetic material. However, when at least a partial portion of the flywheel 13 facing the electromagnet 12 is formed of a ferromagnetic material, the braking can be performed. In addition, if the remaining portion is formed of a material (for example, tungsten) having a density higher than that of the ferromagnetic material, the mass of the flywheel 13 can be increased without increasing the volume of the flywheel 13, and the accumulated angular momentum per same rotation speed of the reaction wheel 1 can be increased.

With such a configuration, the reaction wheel apparatus can be further downsized. While the above-mentioned conventional reaction wheel apparatus 5 has the size of 10 cm$^3$, a very small reaction wheel apparatus whose size is not larger than 30 mm$^3$ can be realized.

In the above-mentioned embodiment, the number of the reaction wheels is three, and the flywheels of the reaction wheels are mutually orthogonal in the direction of the axis of rotation. However, the number of the reaction wheels can be an arbitrary number not smaller than two as long as the flywheels are mutually different in the direction of the axis of rotation.

Second Embodiment

Figure 7:
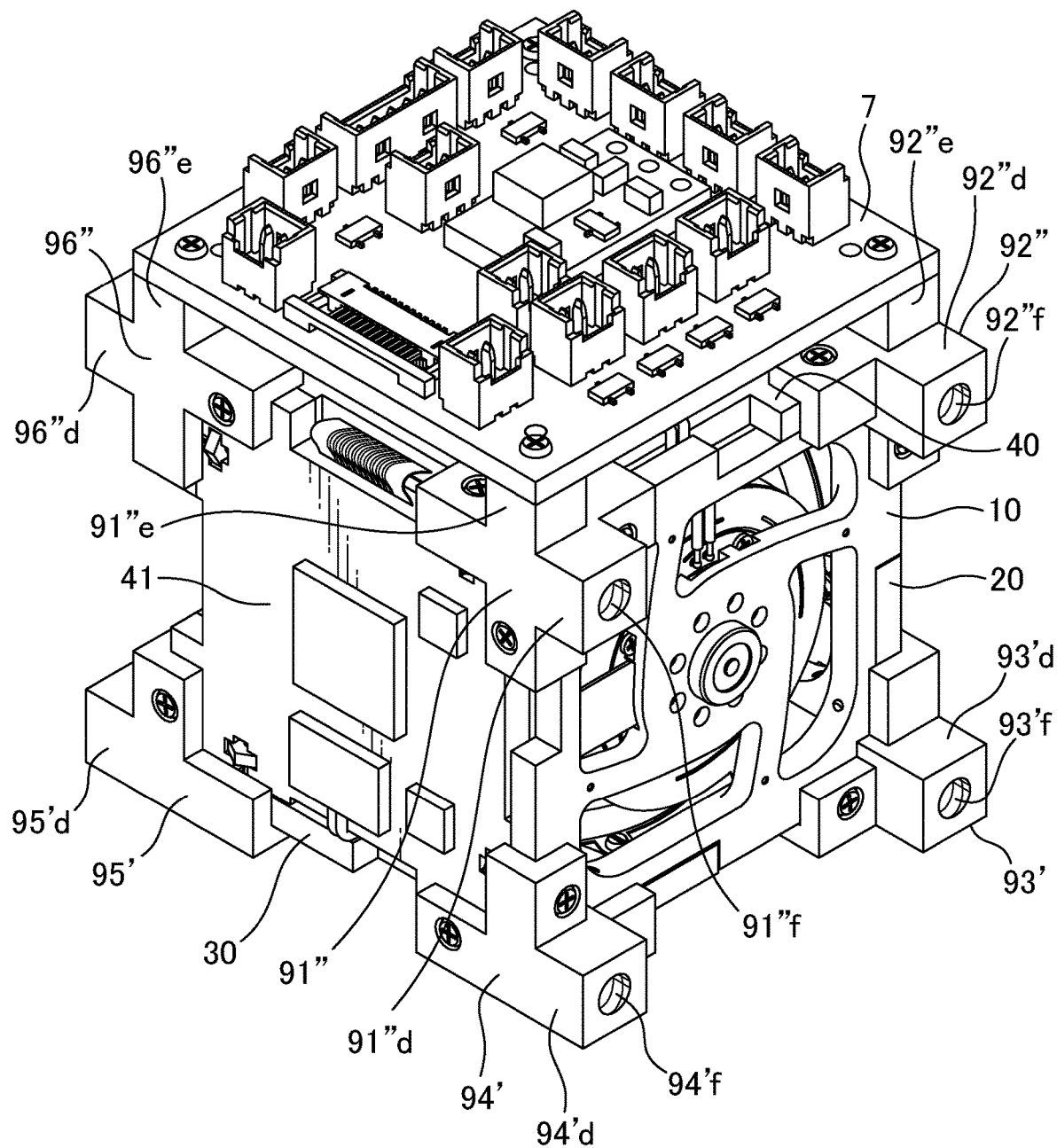
FIG. 7 is a perspective view illustrating a reaction wheel system apparatus according to a second embodiment of the present invention.

FIG. 7 is a perspective view illustrating a reaction wheel apparatus according to a second embodiment of the present invention. The configuration and the operation principle of the second embodiment of the present invention will be described with reference to FIG. 7. In FIG. 7, portions corresponding to those in FIGS. 1 to 6 are denoted by the same reference numerals and explanations similar to those in the first embodiment will be omitted.

In the present embodiment, an external device such as an expansion substrate can be connected to the reaction wheel apparatus according to the first embodiment.

The connection assist members 91 to 98 according to the first embodiment have three branches extending in three directions orthogonal to each other along each side of the housing of the reaction wheel apparatus 5. On the other hand, connection assist members 93', 94', 95', and 98' and connection assist members 91", 92", 96", and 97" according to the present embodiment have branches 93'*d*, 94'*d*, 95'*d*, and 98'*d* extending in one direction outside the reaction wheel apparatus 5 and branches 91"d, 92"d, 96"d, 97"d, 91"e, 92"e, 96"e, and 97"e extending in two directions outside the reaction wheel apparatus 5. These branches are formed with female screw parts 93'*f*, 94'*f*, 95'*f*, 98'*f*, 91"f, 92"f, 96"f, and 97"f. An expansion substrate 7 is screwed to the branches 91"e, 92"e, 96"e, and 97"e.

Further, if a connection assist member having a male screw part is prepared instead of the configuration in which the branch is formed with the female screw part, a connection assist member formed with a female screw part and a connection assist member formed with a male screw part can be screwed beforehand, and then two reaction wheel apparatuses 5 can be connected to this so that two or more reaction wheel apparatuses 5 can be mutually connected.

As mentioned above, when the connection assist member to be used when connecting frame parts with each other is configured to be connectable to an external device, an external device such as an expansion substrate or an additional reaction wheel apparatus can be attached to a reaction wheel apparatus.

When the external device to be attached is an expansion substrate, it becomes possible to control an external device. For example, if a propulsion mechanism such as a thruster or a fan is connected as the external device, one module is usable for both of attitude control and translation control.

In addition, when the external device to be attached is a reaction wheel apparatus, by interconnecting a plurality of reaction wheel apparatuses for clustering them, an increased amount of torque can be generated and a necessary amount of torque according to the purpose can be generated. Also, even if a single axis in a multi-axis configuration fails, triaxial control is still feasible using other axes, so that the robustness of the system can be improved.

In the above-mentioned embodiment, the connection assist member to which an external device can be connected is attached to a vertex part of the housing of the reaction wheel apparatus. However, it may be attached to a side region of the housing of the reaction wheel apparatus.

Although the present invention has been described with reference to some exemplary embodiments, the present invention is not limited to them and it will be apparent to those skilled in the art that the form and details can be modified and changed in various ways without departing from the scope and spirit of the present invention.

<Motor Rotation Speed Detection Device>

The above-mentioned reaction wheel apparatus includes the motor. Hereinafter, a motor rotation speed detection device will be described.

As a method for detecting the rotational speed of a brushless motor, a method for using a Hall sensor or an encoder is generally used. In particular, among various rotational speed detection methods using Hall sensors, a method using three Hall sensors is generally and widely known.

Figure 20:
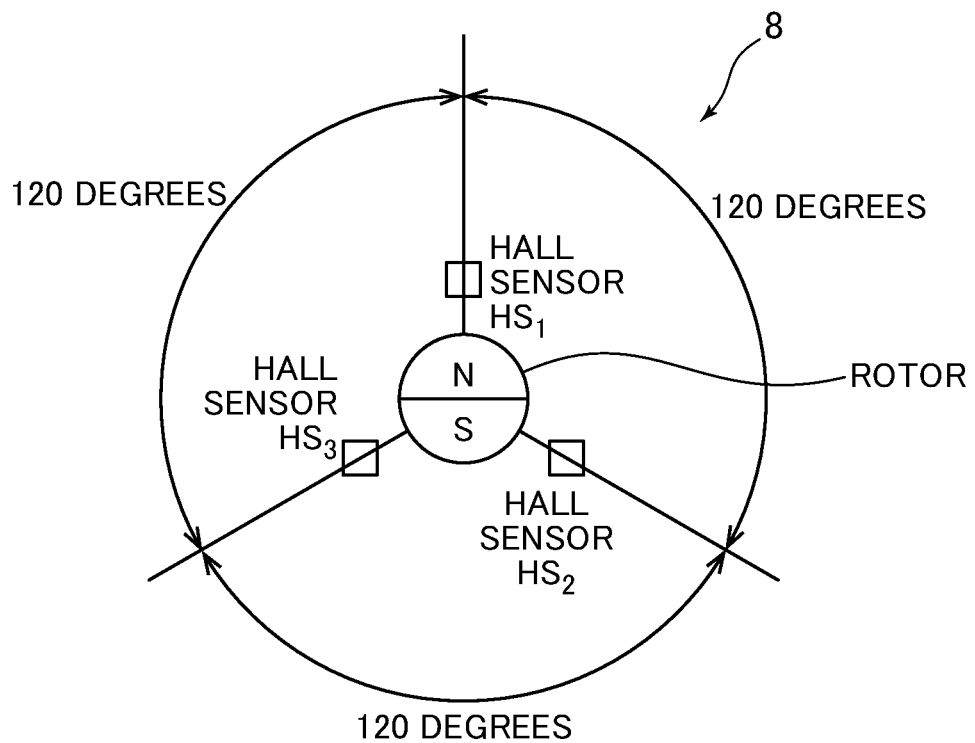
FIG. 20 is a diagram illustrating the operation principle of a conventional three-phase brushless motor.

FIG. 20 is a view illustrating the operation principle of a conventional three-phase brushless motor. Operations of a conventional motor rotation speed detection device will be described with reference to FIG. 20.

A rotor of the brushless motor includes a magnetic pole pair constituted by an N-pole and an S-pole. Three Hall sensors, i.e., Hall sensor $HS_1$, Hall sensor $HS_2$, and Hall sensor $HS_3$, are disposed around the rotor as position sensors at equal intervals of electrical angle 120°.

Figure 21:
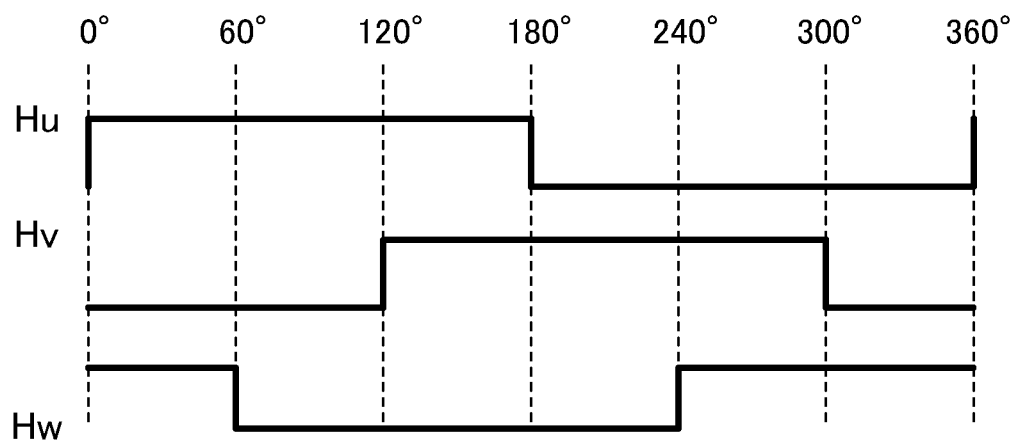
FIG. 21 is a diagram illustrating the state of output signals Hu, Hv, and Hw of Hall sensor $HS_1$, $HS_2$, and $HS_3$ with respect to the rotation phase angle of the rotor.

The rotor is configured to rotate in the brushless motor. When the magnetic pole switches from the S-pole to the N-pole or from the N-pole to the S-pole while the rotor is rotating around its rotation axis, each Hall sensor detects this switching and changes the state (Hi-level or Low-level) of its output signal as illustrated in FIG. 21. FIG. 21 illustrates the state of output signals Hu, Hv, and Hw of the Hall sensors $HS_1$, $HS_2$, and $HS_3$ with respect to the rotation phase angle of the rotor. FIG. 22 illustrates the same state with values (Hi-level=1, and Low-level=0) of the output signals. By combining the values of the output signals Hu, Hv, and Hw, the rotor rotation phase angle can be divided into sections B1 to B6 (i.e., six states) at equal intervals of 60 degrees.

Accordingly, the rotational speed of the rotor can be detected by using the output signals of respective Hall sensors. More specifically, by counting the number of clock pulses in each of the sections B1 to B6 with a counter, the rotational speed of the motor (average rotational speed in respective sections B1 to B6) can be detected. Assuming that the frequency of the clock pulse is fc [Hz], since the counter counts the number n of clock pulses with respect to ⅙ rotation in each of the sections B1 to B6 with a phase interval of 60°, the rotational speed ω can be calculated as follows.

$$\Omega = 60 fc/6n = 10 fc/n [\text{rpm}] \quad (1)$$

Problem to be Solved

Here, for example, in order to reduce the cost of the motor rotation speed detection device or reduce the device size for installation into a small-sized device, it will be discussed to detect the rotational speed by using a smaller number of Hall sensors than the number of phases of the motor, for example, by using two signals Hu, Hv of the output signals Hu, Hv, and Hw of the Hall sensors. FIG. 23 illustrates the values of the output signals Hu and Hv of the Hall sensors with respect to the rotor rotation phase angle. In this case, the rotor rotation phase angle can be divided into sections B1' to B4' (four states).

In this case, although the phase interval of the sections B1' and B3' is 120°, the phase interval of the sections B2' and B4' is 60° and is different from the phase interval of the sections B1' and B3'. Accordingly, since the time for counting the clock pulses is different between the sections B2' and B4' and the sections B1' and B3', it is impossible to precisely detect the rotational speed by directly applying the conventional method.

In view of the above, one object of the present motor rotation speed detection device is to provide a motor rotation speed detection device that can precisely detect the rotational speed with a smaller number of Hall sensors than the number of phases of the motor.

Means for Solving Problem

One aspect of the present motor rotation speed detection device is to provide a motor rotation speed detection device, which is a rotation speed detection device for an M-phase motor whose number of magnetic pole pairs is P, including first to Nth (N is an integer larger than 1 and smaller than M) Hall sensors disposed at intervals of an integral multiple of electrical angle 180/M°, a section determination unit configured to generate and output first to Nth signals in which only the i-th signal is a signal representing a first state and all the remaining signals are signals representing a second state that is different from the first state from the output signals of the first to Nth Hall sensors, in each of sections Bij (j is an integer not smaller than 1 and not larger than 2P) having a phase interval of (180/MP).Li° (i is an integer not smaller than 1 and not larger than N, and Li is any integer not smaller than 1 and not larger than (M−N+1)), obtained by dividing each section obtained by dividing the phase section of one rotation of the M-phase motor into 2P pieces into N pieces, a clock pulse output unit configured to output clock pulses of frequency fc/Li in respective sections Bij when the i-th signal of the first to Nth signals is the signal representing the first state, a counter for counting the clock pulses output from the output unit for each section Bij, and a rotational speed calculation unit configured to calculate the rotational speed of the motor based on the counting value of the counter.

The clock pulse output unit includes first to K-th clock generators capable of generating clock pulses of first to K-th frequencies with respect to first to K-th frequencies mutually different among the frequency fc/Li, first to Nth operation units, and an OR operation unit. The i-th operation unit can be configured to output the output from the clock generator that generates clock pulses of frequency fc/Li, when the i-th signal is the signal representing the first state. The OR operation unit can be configured to calculate a logical sum of the output signals from the first to Nth operation units and output clock pulses of frequency fc/Li in section B1.

The first state is a first logic, and the second state is a second logic different from the first logic. The first to Nth operation units are AND operation units. The i-th operation unit can be configured to calculate a logical product of the output from the clock generator that generates clock pulses of frequency fc/Li and a logic represented by the i-th signal.

The clock pulse output unit can be configured to include a clock generator for generating clock pulses of frequency fc and a clock frequency converter for multiplying the output of the clock generator by 1/Li when the i-th signal is the signal representing the first state so as to generate clock pulses of frequency fc/Li in respective sections Bij.

Another aspect of the present motor rotation speed detection device is to provide a motor rotation speed detection device that is a rotation speed detection device for an M-phase motor whose number of magnetic pole pairs is P, including first to Nth (N is an integer larger than 1 and smaller than M) Hall sensors disposed at intervals of an integral multiple of electrical angle 180/M°, a section determination unit configured to generate and output first to Nth signals in which only the i-th signal is a signal representing a first state and all the remaining signals are signals representing a second state that is different from the first state from the output signals of the first to Nth Hall sensors, in each of sections Bij (j is an integer not smaller than 1 and not larger than 2P) having a phase interval of (180/MP).Li° (i is an integer not smaller than 1 and not larger than N, and Li is any integer not smaller than 1 and not larger than (M−N+1)), obtained by dividing each section obtained by dividing the phase section of one rotation of the M-phase motor into 2P pieces into N pieces, a clock pulse output unit configured to output clock pulses of frequency fc, a counter for counting the clock pulses output from the output unit for each section Bij, and a rotational speed calculation unit configured to calculate the rotational speed of the motor based on a value obtained by multiplying the counting value of the counter by 1/Li, for each section Bij, when the i-th signal of the first to Nth signals is the signal representing the first state.

P=1, M=3, N=2, and the section determination unit can be configured to calculate an exclusive OR of the output signals of the first and second Hall sensors and a negation of the exclusive OR and then output the calculation results as a first signal and a second signal, respectively.

Advantageous Effect of Invention

According to the present motor rotation speed detection device having the above-mentioned configuration, the motor rotation speed detection device capable of precisely detecting the rotational speed with a smaller number of Hall sensors than the number of phases of the motor can be provided.

Hereinafter, an embodiment of the motor rotation speed detection device will be described with reference to the drawings.

First Embodiment of Motor Rotation Speed Detection Device

Figures 8, 9:
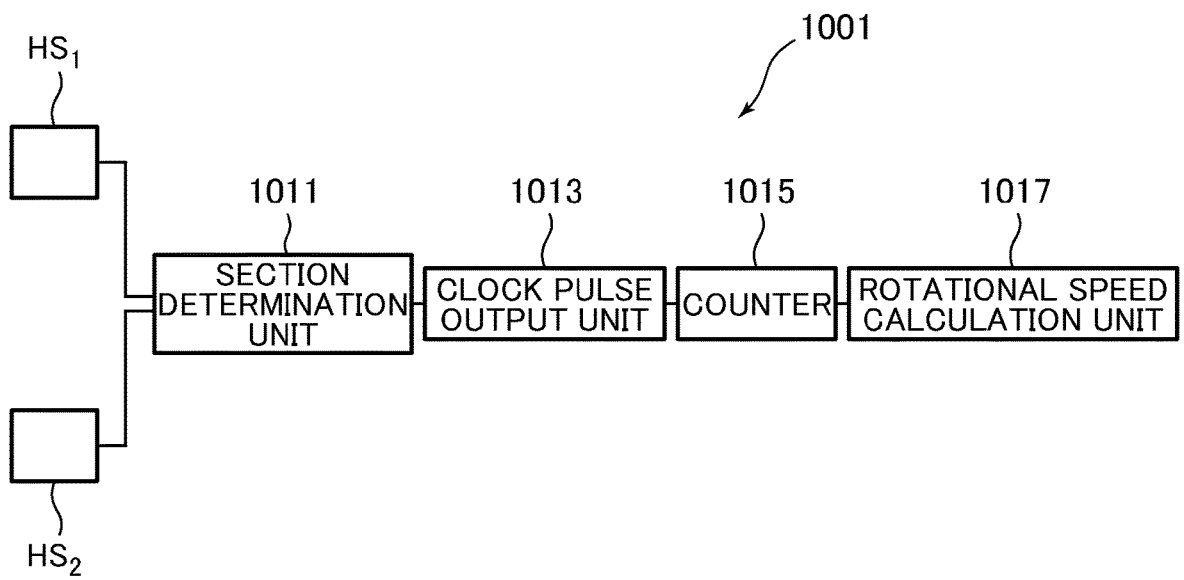
FIG. 8 is a diagram illustrating the principle of a first embodiment of a motor rotation speed detection device.
FIG. 9 is a diagram illustrating the entire configuration of the first embodiment of the motor rotation speed detection device.

FIG. 8 is a diagram illustrating the principle of the first embodiment of the motor rotation speed detection device.

As mentioned above, when the number of usable Hall sensors is three, clock pulses are counted by the counter for each of respective sections B1 to B6, and the rotational speed of the motor can be calculated based on the counting values.

In the conventional method, the problem when the number of usable Hall sensors is reduced to two is caused by counting clock pulses of the same frequency in sections with different phase intervals. The present inventors have found that switching the frequencies of the clock pulses to be counted between the sections B1' and B3' and the sections B2' and B4' can solve the problem.

To this end, it is necessary to discriminate between the sections B1' and B3' having the phase interval of 120° and the sections B2' and B4' having the phase interval of 60°. For example, respective sections can be distinguished by an XOR operation of the output signals Hu and Hv of the Hall sensors and a NOT operation thereof. FIG. 8 illustrates calculation results.

Accordingly, the same counter can be used to detect the rotational speed by counting clock pulses of fc/2 [Hz] in the sections B1' and B3' having the phase interval of 120° and counting clock pulses of fc [Hz] in the sections B2' and B4' having phase interval of 60° (i.e., ½ of 120°).

More specifically, in the sections B1' and B3' having the phase interval of 120°, since the number N of clock pulses of fc/2 [Hz] is counted with respect to ⅓ rotation, the rotational speed Ω can be calculated as follows.

$$\Omega = 60fc/2/\tfrac{1}{3}N = 10fc/N [rpm] \quad (2).$$

On the other hand, in the sections B2' and B4' having the phase interval of 60°, since the number N of clock pulses of fc [Hz] is counted with respect to ⅙ rotation, the rotational speed can be calculated as follows.

$$\Omega = 60fc/6N = 10fc/N [rpm] \quad (3)$$

Accordingly, the same counter can be used to detect the rotational speed even when the number of usable Hall sensors is two, i.e., the number smaller than the number of phases of the motor.

Figure 10:
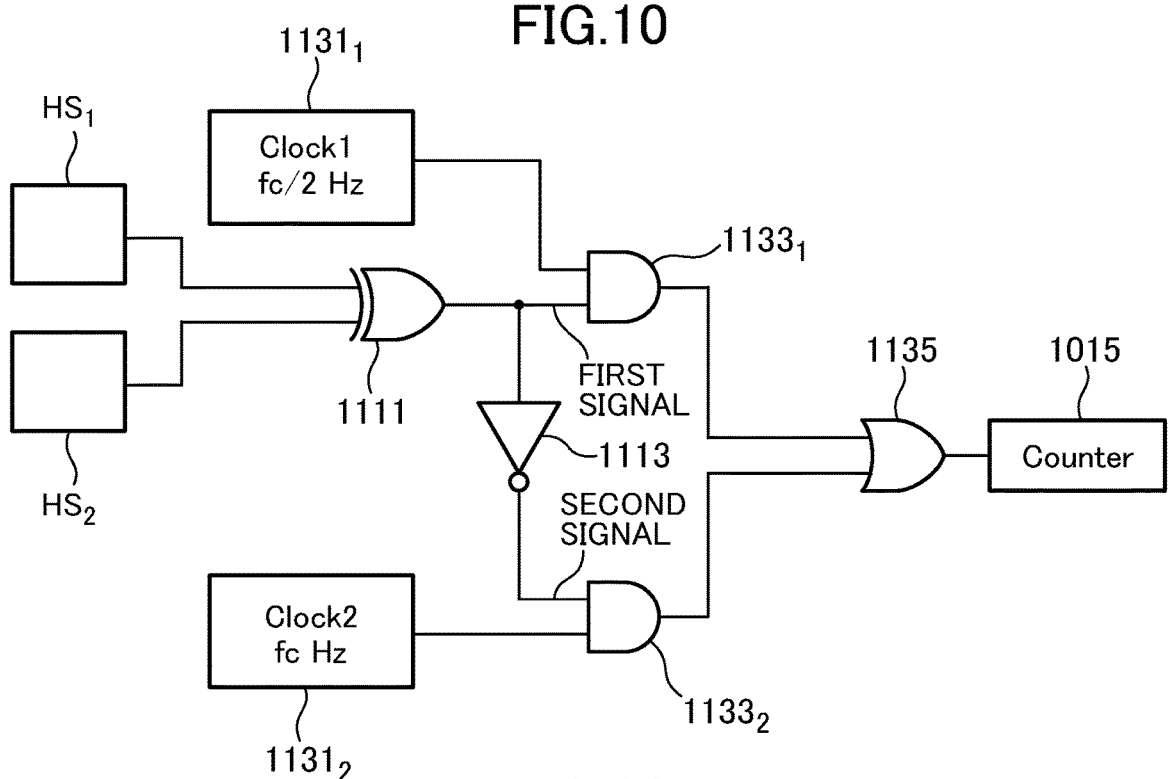
FIG. 10 is a diagram illustrating an exemplary circuit configuration of a section determination unit and a clock signal output unit of the first embodiment of the motor rotation speed detection device.

FIG. 9 is a diagram illustrating the entire configuration of the first embodiment of the motor rotation speed detection device. FIG. 10 is a diagram illustrating an exemplary circuit configuration of the section determination unit and the clock pulse output unit of the first embodiment of the motor rotation speed detection device.

The motor rotation speed detection device 1001 includes first Hall sensor $HS_1$, second Hall sensor $HS_2$, section determination unit 1011, clock pulse output unit 1013, counter 1015 that counts clock pulses output from the clock pulse output unit 1013 for each of the sections B1' to B4', and rotational speed calculation unit 1017 that calculates the rotational speed of the motor based on the counting value of the counter 1015.

The first Hall sensor $HS_1$ and the second Hall sensor $HS_2$ are disposed at an interval of electrical angle 120° in the clockwise direction.

The section determination unit 1011 includes XOR element 1111 and NOT element 1113. The clock pulse output unit 1013 includes first clock pulse generator $1131_1$ that generates clock pulses of frequency fc/2, second clock pulse generator $1131_2$ that generates clock pulses of frequency fc, first AND element $1133_1$, second AND element $1133_2$, and OR element 1135.

The first Hall sensor $HS_1$ and the second Hall sensor $HS_2$ have output lines connected to input lines of the XOR element 1111. The XOR element 1111 has an output line and the first clock pulse generator $1131_1$ has an output line, which are connected to input lines of the first AND element $1133_1$. Further, the output line of the XOR element 1111 is connected to an input line of the second AND element $1133_2$ via the NOT element 1113. The second clock pulse generator $1131_2$ has an output line connected to an input line of the second AND element $1133_2$. The first AND element $1133_1$ has an output line and the second AND element $1133_2$ has an output line, which are connected to input lines of the OR element 1135. The OR element 1135 generates an output, which is output as an output of the clock pulse output unit 1013.

The counter 1015 counts the clock pulses output from the clock pulse output unit 1013 and resets its counting value based on the output from the XOR element 1111, when any one of the sections B1' to B4' changes to another section. As a result, the counter 1015 can count the clock pulses output from the clock pulse output unit 1013 for each of the sections B1' to B4'.

The rotational speed calculation unit 1017 calculates the rotational speed of the motor based on the counting value of the counter 1015.

Operations of the first embodiment of the motor rotation speed detection device will be described on the premise of the above-mentioned apparatus configuration.

Referring to FIG. 8, in the sections B1' and B3', the output from the XOR element 1111 is 1. Therefore, the section determination unit 1011 generates and outputs the first signal indicating the first state by the value of 1 and the second signal indicating the second state by the value of 0. The first signal having the value of 1 from the section determination unit 1011 and the clock pulses of frequency fc/2 from the first clock pulse generator $1131_1$ are input to the first AND element $1133_1$. On the other hand, the second signal having the value of 0 from the section determination unit 1011 is input to the second AND element $1133_2$. Accordingly, the clock pulses of frequency fc/2, i.e., the output from the first clock pulse generator $1131_k$, are directly output from the OR element 1135, more specifically from the clock pulse output unit 1013. In this case, since the phase interval of the sections B1' and B3' is 120°, the counter 1015 counts the number n of the clock pulses of fc/2 [Hz] with respect to ⅓ rotation. Therefore, based on this, the rotational speed calculation unit 1017 calculates the rotational speed Ω according to the above-mentioned formula (2).

On the other hand, in the sections B2' and B4', the output from the XOR element 1111 is 0. Therefore, the section determination unit 1011 generates and outputs the first signal indicating the second state by the value of 0 and the second signal indicating the first state by the value of 1. The second signal having the value of 0 from the section determination unit 1011 is input to the first AND element $1133_1$. On the other hand, the second signal having the value of 1 from the section determination unit 1011 and the clock pulses of frequency fc from the second clock pulse generator $1131_2$ are input to the second AND element $1133_2$. Accordingly, the clock pulses of frequency fc, i.e., the output from the second clock pulse generator $1131_2$, are directly output from the OR element 1135, more specifically, from the clock pulse output unit 1013. In this case, since the phase interval of the sections B2' and B4' is 60°, the counter 1015 counts the number n of clock pulses of fc [Hz] with respect to ⅙ rotation. Therefore, based on this, the rotational speed calculation unit 1017 calculates the rotational speed Ω according to the above-mentioned formula (3).

In this case, as understood from FIG. 8, since the output signal of the first AND element $1133_1$ is contrary to the output signal of the second AND element $1133_2$ (when one is 1, the other is 0), the output signal of the first AND element $1133_1$ and the output signal of the second AND element $1133_2$ are never input simultaneously to the counter 1015.

In the above-mentioned embodiment, although the value "0" is used to indicate the first state and the value "1" is used to indicate the second state, the circuit configurations of the section determination unit and the clock pulse output unit may be modified to use "1" to indicate the first state and use "0" to indicate the second state, or any appropriate discriminable different states may be used.

If it is difficult to prepare two types of clock pulse generators of fc [Hz] and fc/2 [Hz], only the clock pulse generator of fc [Hz] may be used and configured in such a manner that the clock pulse output unit 1013 discriminates each section based on the output from the XOR element 1111, divides the clock pulses from the clock pulse output unit 1013 by 2 when the section is B1' or B3', and directly outputs the clock pulses when the section is B2' or B4'.

Alternatively, when using only the clock pulse generator of fc [Hz], the counter 1015 may be configured to discriminate each section based on the output from the XOR element 1111, divide the counting value of each clock pulse from the clock pulse output unit 1013 by 2 and output it the rotational speed calculation unit 1017 when the section is B1' or B3', and directly output the counting value of each clock pulse from the clock pulse output unit 1013 to the rotational speed calculation unit 1017 when the section is B2' or B4'.

With such a configuration, the rotational speed of the motor can be detected by using a smaller number of Hall sensors than the number of phases of the motor.

Second Embodiment of Motor Rotation Speed Detection Device

In the first embodiment of the motor rotation speed detection device, two Hall sensors are used to detect the rotational speed of a three-phase motor whose number of magnetic pole pairs is 1. In the present embodiment, as a generalized expression, N Hall sensors disposed at intervals of an integral multiple of electrical angle 360/N° (N is an integer larger than 1 and smaller than M) in the clockwise direction are used to detect the rotational speed of an M-phase motor whose number of magnetic pole pairs is P.

First, the case where the number of magnetic pole pairs is 1 is considered. In the case of using N Hall sensors, since the phase can be divided into two per Hall sensor, the phase can be divided into 2N sections. On the other hand, the minimum value of the phase interval of the divided section is 180/M°. Therefore, when the section of the minimum value 180/M° of the phase interval is referred to as "slot", the number of slots per complete rotation of the rotor is 360/(180/M)=2M.

When the number N of Hall sensors to be used is determined in this manner, the division number of the rotor phase is uniquely determined. However, the phase interval of the divided section (hereinafter, the minimum value 180/M° is assumed to be the basic unit 1) is variable depending on which Hall sensor output signal is used among the N Hall sensors.

Figure 11:
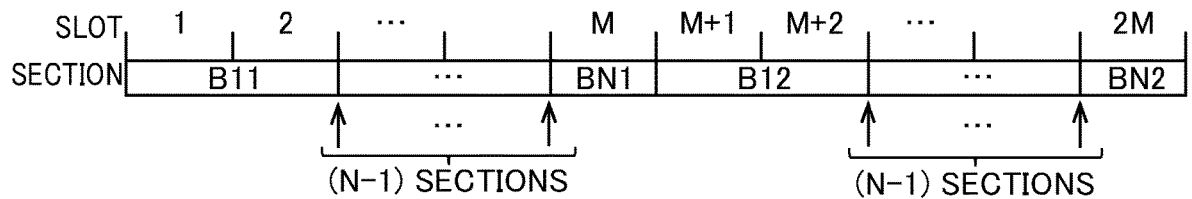
FIG. 11 is a diagram illustrating an exemplary relationship between slots and divided sections.

In this case, cases whose number can be expressed by the number obtained by dividing a phase interval M into N pieces, namely $_MC_N$, occur. When the phase interval of (N−1) pieces of sections is 1, the maximum phase interval of the section is M−N+1 that is the phase interval of the remaining one section. FIG. 11 illustrates an exemplary relationship between slots and divided sections.

It is possible to configure a logical operation circuit that generates first to Nth signals in which only the i-th signal is a signal representing the first state (for example, Hi-level=1) and all the remaining signals are signals representing the second state (for example, Low-level=0) different from the first state, in each section Bi having a phase interval of (180/M)·Li (i is an integer not smaller than 1 and not larger than N, and Li is any integer not smaller than 1 and not larger than (M−N+1)), obtained by dividing the phase section corresponding to one complete rotation of an M-phase motor into N pieces, from the output signals of the first to Nth Hall sensors. More specifically, since the section Bi has a one-to-one correspondence relationship with a combination of the output signals of the first to Nth Hall sensors, it is possible to consider a logical function in which the output signals of the first to Nth Hall sensors are regarded as logical values and the signals are output in such a manner that only the i-th signal is the signal representing the first state (for example, Hi-level=1) and all the remaining signals are the signals representing the second state (for example, Low-level=0) different from the first state. There are many logical formulae expressing the same logical function, it is possible to constitute the logical operation circuit that can create a logical formula to be generated from the output signals of the first to Nth Hall sensors.

Accordingly, when a clock pulse generator of frequency fc/Li [Hz] corresponding to the phase interval Li of each section is prepared, and when the i-th signal of the first to Nth signals is the signal representing the first state, by configuring in such a way as to output clock pulses of the frequency fc/Li in the section Bi and by counting the clock pulses with a counter, the rotational speed can be detected by the same counter.

More specifically, since the number n of the clock pulses of fc/Li [Hz] is counted with respect to Li/2M rotation, the rotational speed Ω can be calculated as follows.

$$\Omega = 60 \times (Li/2M) \times (fc/(nLi)) = 30 fc/Mn \text{[rpm]} \quad (4)$$

Therefore, regardless of the section phase interval Li, it is feasible to detect the rotational speed by the same counter with a smaller number of N Hall sensors than the number of phases of the motor.

Although the above discussion was made assuming that the number of magnetic pole pairs 1, it is easy to expand it by generalizing the number of magnetic pole pairs with P. When the number of magnetic pole pairs is P, the phase division number is P times. The output signal of the Hall sensor in the division state of P times is merely the repetition of the same cycle. Each section Bij (j is an integer not smaller than 1 and not larger than 2P) having a phase interval of (180/MP)·Li (i is an integer not smaller than 1 and not larger than N, and Li is any integer not smaller than 1 and not larger than (M−N+1)), obtained by dividing the phase section corresponding to one complete rotation of the M-phase motor into 2P pieces and further dividing each section into N pieces, has the following properties.

(1) The logic in respective sections Bij in which the numerical values of j are odd numbers or the numerical values of j are even numbers is consistent. More specifically, $Bi1 = Bi3 = \ldots = Bi,(2m-1)$ $Bi2 = Bi4 = \ldots = Bi,2m.$ (2) The logic in respective sections Bij in which the numerical values of j differ by 1 has an inverted relationship. More specifically, $Bi1 = \overline{Bi2}$ $Bi3 = \overline{Bi4}$ $Bi,(2m-1) = \overline{Bi,2m}$ Here, m is an integer not larger than P.

Further, it is possible to configure a logical operation circuit that generates first to Nth signals in which only the i-th signal is a signal representing the first state and all the remaining signals are signals representing the second state that is different from the first state, in respective sections Bij, from the output signals of the first to Nth Hall sensors. More specifically, since the section Bij has a one-to-one correspondence relationship with a combination of the output signals of the first to Nth Hall sensors, it is possible to consider a logical function in which the output signals of the first to Nth Hall sensors are regarded as logical values and the signals are output in such a manner that only the i-th signal is the signal representing the first state (for example, Hi-level=1) and all the remaining signals are the signals representing second state (for example, Low-level=0) different from the first state. There are many logical formulae expressing the same logical function, it is possible to constitute the logical operation circuit that can create a logical formula to be generated from the output signals of the first to Nth Hall sensors.

Accordingly, when a clock pulse generator of frequency fc/Li [Hz] corresponding to the phase interval Li of each section is prepared, and when the i-th signal of the first to Nth signals is the signal representing the first state, by configuring in such a way as to output clock pulses of the frequency fc/Li in the section Bij and by counting the clock pulses with a counter, the rotational speed can be detected by the same counter.

More specifically, since the number n of the clock pulses of fc/Li [Hz] is counted with respect to Li/2MP rotation, the rotational speed Ω can be calculated as follows.

$$\Omega = 60 \times (Li/(2MP)) \times (fc/(nLi)) = 60fc/2MPn [\text{rpm}] \quad (5)$$

Therefore, regardless of the section phase interval Li, it is feasible to detect the rotational speed by the same counter with a smaller number of N Hall sensors than the number of phases of the motor.

Figure 12:
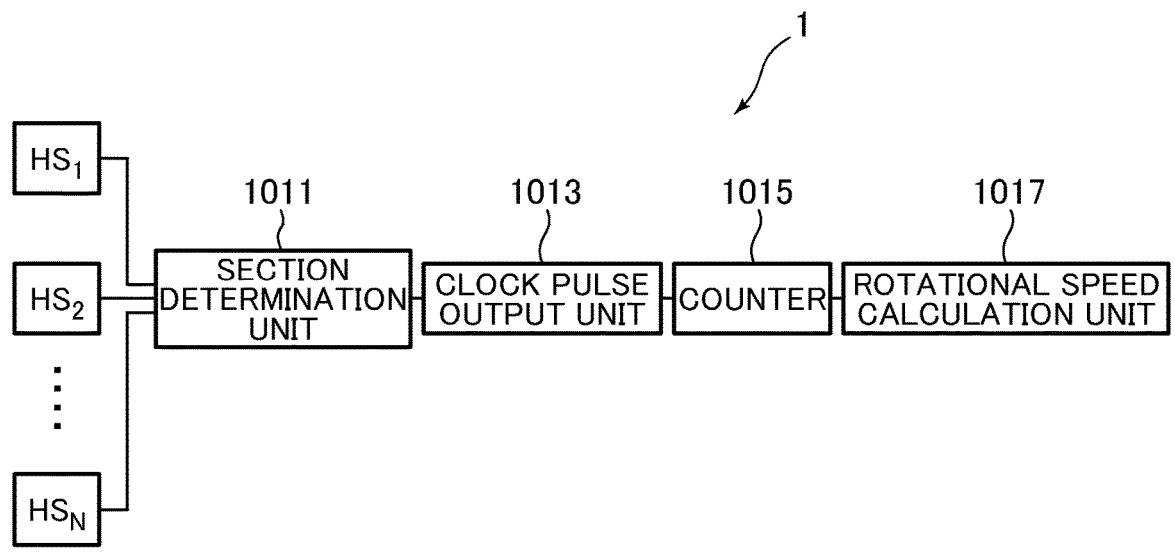
FIG. 12 is a diagram illustrating the entire configuration of a second embodiment of the motor rotation speed detection device.
Figure 13:
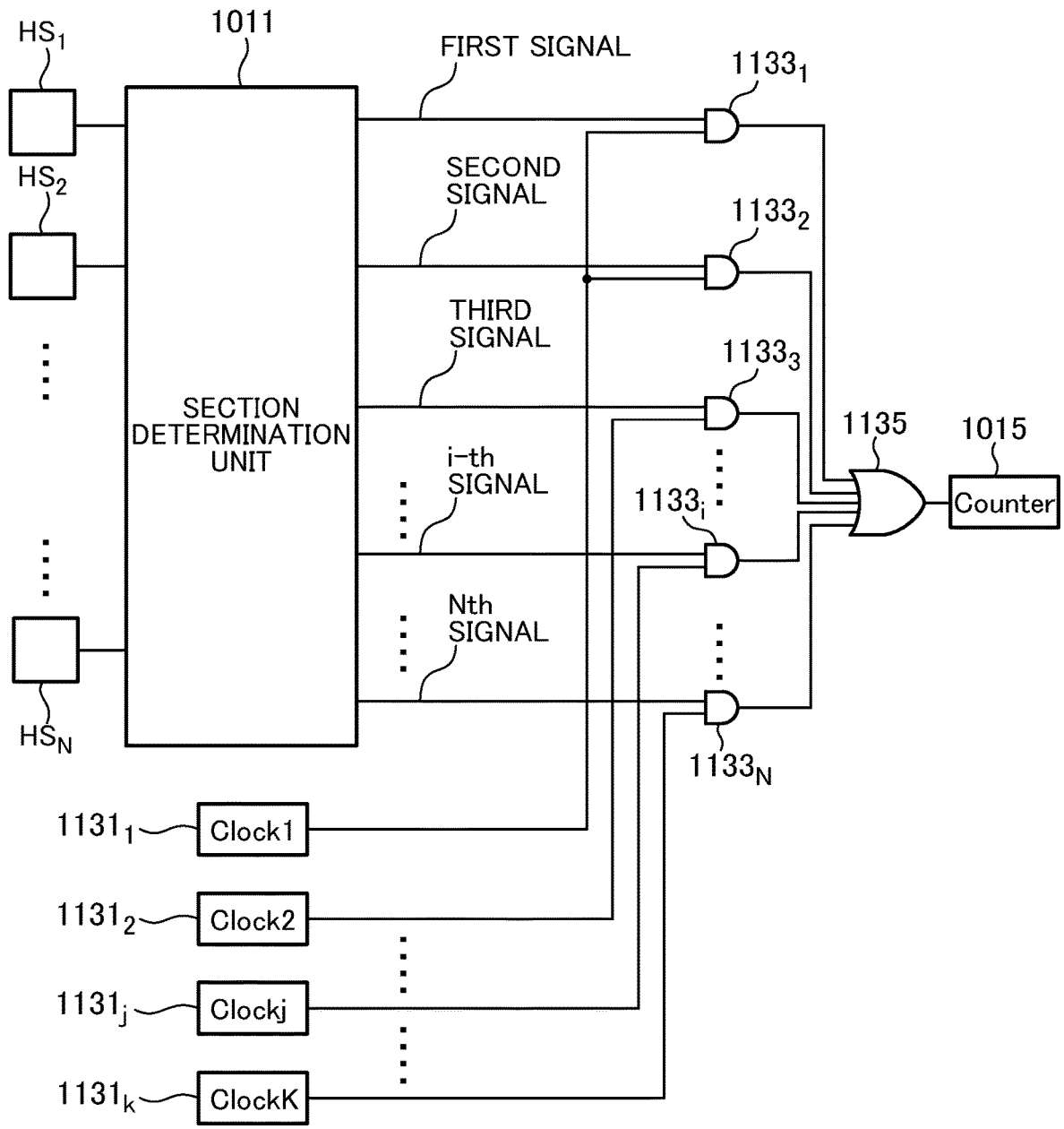
FIG. 13 is a diagram illustrating an exemplary circuit configuration of a section determination unit and a clock pulse output unit according to the second embodiment of the motor rotation speed detection device.

FIG. 12 is a diagram illustrating the entire configuration of the second embodiment of the motor rotation speed detection device. FIG. 13 is a diagram illustrating an exemplary circuit configuration of a section determination unit and a clock pulse output unit according to the second embodiment of the motor rotation speed detection device. In FIGS. 12 and 13, portions similar to those in FIGS. 9 and 10 are denoted by the same reference numerals and explanations similar to those in the first embodiment will be omitted.

A motor rotation speed detection device 1 includes first to Nth Hall sensors $HS_1$ to $HS_N$, section determination unit 1011, clock pulse output unit 1013, counter 1015 for counting clock pulses output from the clock pulse output unit 1013 for each section Bij, and rotational speed calculation unit 1017 configured to calculate the rotational speed of the motor based on the counting value of the counter 1015.

The first to Nth Hall sensors $HS_1$ to $HS_N$ are disposed at intervals of an integral multiple of electrical angle 180/M° in the clockwise direction.

The section determination unit 1011 generates and outputs first to Nth signals in which only the i-th signal is a signal representing the first state and all the remaining signals are signals representing the second state that is different from the first state, in respective sections Bij (j is an integer not smaller than 1 and not larger than 2P) having a phase interval of (180/MP)·Li° (i is an integer not smaller than 1 and not larger than N, and Li is any integer not smaller than 1 and not larger than (M−N+1)), obtained by dividing the phase section corresponding to one complete rotation of the M-phase motor into 2P pieces and further dividing each section into N pieces, from the output signals of the first to Nth Hall sensors $HS_1$ to $HS_N$.

The clock pulse output unit 1013 includes first to K-th clock pulse generators $1131_1$ to $1131_K$ capable of generating clock pulses of first to K-th frequencies with respect to first to K-th frequencies mutually different among the frequency fc/Li, first to Nth AND element $1133_1$ to $1133_N$ serving as first to Nth operation units, and OR element 1135 serving as an OR operation unit. The i-th signal output from the section determination unit 1011 and clock pulses of the clock pulse generator $1131_j$ (i.e., one of the first to K-th clock pulse generators $1131_1$ to $1131_K$) that generates clock pulses of frequency fc/Li are input to the i-th AND element $1133_j$. Outputs from the first to Nth AND elements $1133_1$ to $1133_N$ are input to the OR element 1135. The output from the OR element 1135 is output as an output of the clock pulse output unit 1013.

The counter 1015 counts the clock pulses output from the clock pulse output unit 1013 and resets its counting value based on the output from the section determination unit 1011, when any one of the sections Bij changes to another section. As a result, the counter 1015 can count the clock pulses output from the clock pulse output unit 1013 for each of the sections Bij.

The rotational speed calculation unit 1017 calculates the rotational speed Ω of the motor based on the counting value of the counter 1015, according to the above-mentioned formula (4).

If it is difficult to prepare K types of clock pulse generators of fc/Li [Hz] (i=1, 2, . . . , K), only the clock pulse generator of fc [Hz] may be used and configured in such a way as to discriminate each section based on the output from the section determination unit 1011, divide the clock pulses from the clock pulse output unit 1013 by 1/Li according to the section phase interval, and output the divided clock pulses.

Alternatively, when using only the clock pulse generator of fc [Hz], it may be configured to discriminate each section based on the output from the section determination unit 1011, multiply the counting value of the counter by 1/L according to the section phase interval, and output the multiplied counting value to the rotational speed calculation unit 1017.

Hereinafter, some specific examples will be described.

<1 Magnetic Pole Pair, 5 Phases, and 3 Hall Sensors>

In the case of P=1 with respect to the number of magnetic pole pairs, M=5 with respect to the number of phases, and N=3 with respect to the number of Hall sensors, the division number of the rotor phase is 2N=6 and six states are detectable. When using the output signals of the Hall sensors $HS_1$, $HS_2$, and $HS_3$ disposed at intervals of electrical angle 180/5=36° in the clockwise direction, FIG. 14 illustrates values of the output signals of the Hall sensors $HS_1$, $HS_2$, and $HS_3$ with respect to the rotor rotation phase angle.

Figures 14, 15:
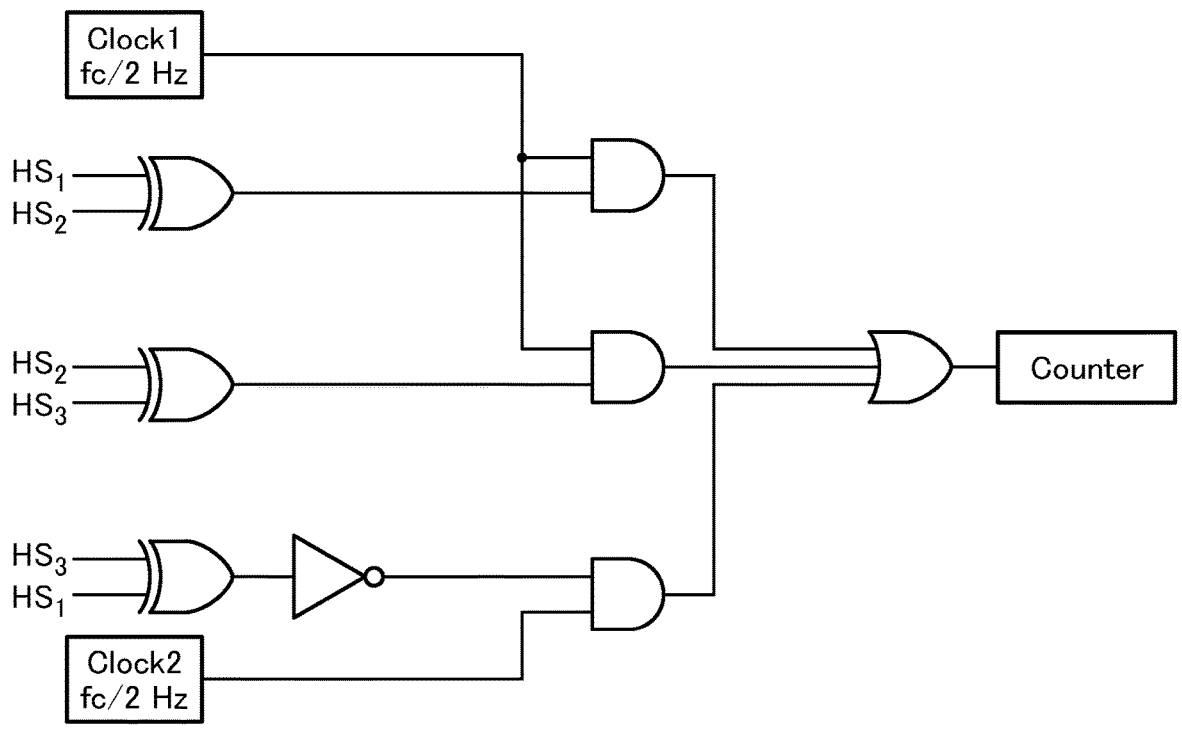
FIG. 14 is a diagram illustrating values of output signals of Hall sensors $HS_1$, $HS_2$, and $HS_3$ and the output of the section determination unit with respect to the rotor rotation phase angle.
FIG. 15 is a diagram illustrating an exemplary circuit configuration of a section determination unit and a clock pulse output unit according to the second embodiment of the motor rotation speed detection device.

From FIG. 14, since phase intervals L1 and L2 of respective sections B11, B21, B12, and B22 are 2 when the angle 36° is the basic unit and phase interval L3 of respective sections B31 and B32 is 1 when the angle 36° is the basic unit, it is sufficient to prepare a first clock pulse generator for generating clock pulses of the frequency fc/2 [Hz] and a second clock pulse generator for generating clock pulses of the frequency fc [Hz]. FIG. 15 illustrates an exemplary circuit configuration adoptable in this case. FIG. 14 illustrates the output of the section determination unit 1011 in this case.

Figures 16, 17:
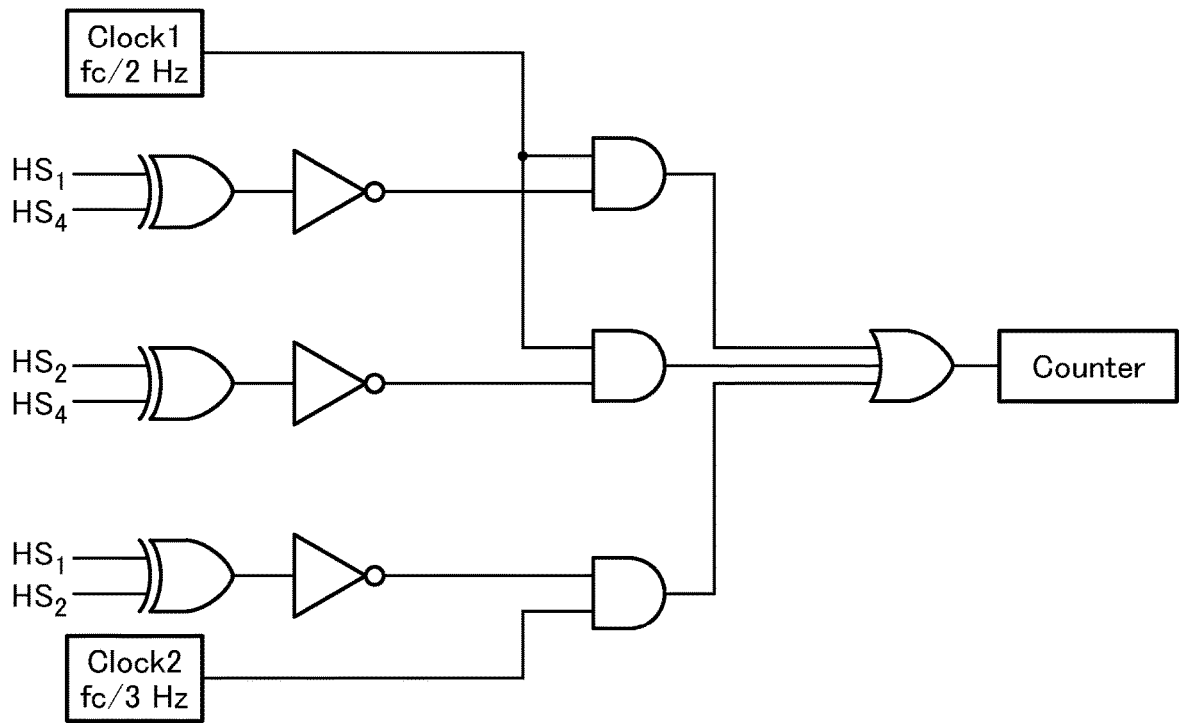
FIG. 16 is a diagram illustrating values of output signals of Hall sensors $HS_1$, $HS_2$, and $HS_3$ and the output of the section determination unit with respect to the rotor rotation phase angle.
FIG. 17 is a diagram illustrating an exemplary circuit configuration of a section determination unit and a clock pulse output unit according to the second embodiment of the motor rotation speed detection device.

Next, when using the output signals of the first and second Hall sensors $HS_1$ and $HS_2$ disposed at an interval of electrical angle 180/5=36° in the clockwise direction and the fourth Hall sensor $HS_4$ disposed at an interval of electrical angle 72° with respect to the second Hall sensor $HS_2$ in the clockwise direction, FIG. 16 illustrates values of the output signals of the first, second, and fourth Hall sensors $HS_1$, $HS_2$, and $HS_4$ with respect to the rotor rotation phase angle.

From FIG. 17, since phase intervals L1 and L2 of respective sections B11, B21, B12, and B22 are 1 when the angle 36° is the basic unit and phase interval L3 of respective sections B31 and B32 is 3 when the angle 36° is the basic unit, it is sufficient to prepare a first clock pulse generator for generating clock pulses of the frequency fc [Hz] and a second clock pulse generator for generating clock pulses of the frequency fc/3 [Hz]. FIG. 17 illustrates an exemplary circuit configuration adoptable in this case. FIG. 16 illustrates the output of the section determination unit 11 in this case.

<1 Magnetic Pole Pair, 5 Phases, and 4 Hall Sensors>

In the case of P=1 with respect to the number of magnetic pole pairs, M=5 with respect to the number of phases, and N=4 with respect to the number of Hall sensors, the division number of the rotor phase is 2N=8 and eight states are detectable. When using the output signals of the first to fourth Hall sensors $HS_1$, $HS_2$, $HS_3$, and $HS_4$ disposed at intervals of electrical angle 180/5=36° in the clockwise direction, FIG. 18 illustrates values of the output signals of the Hall sensors $HS_1$, $HS_2$, $HS_3$, and $HS_4$ with respect to the rotor rotation phase angle.

Figures 18, 19:
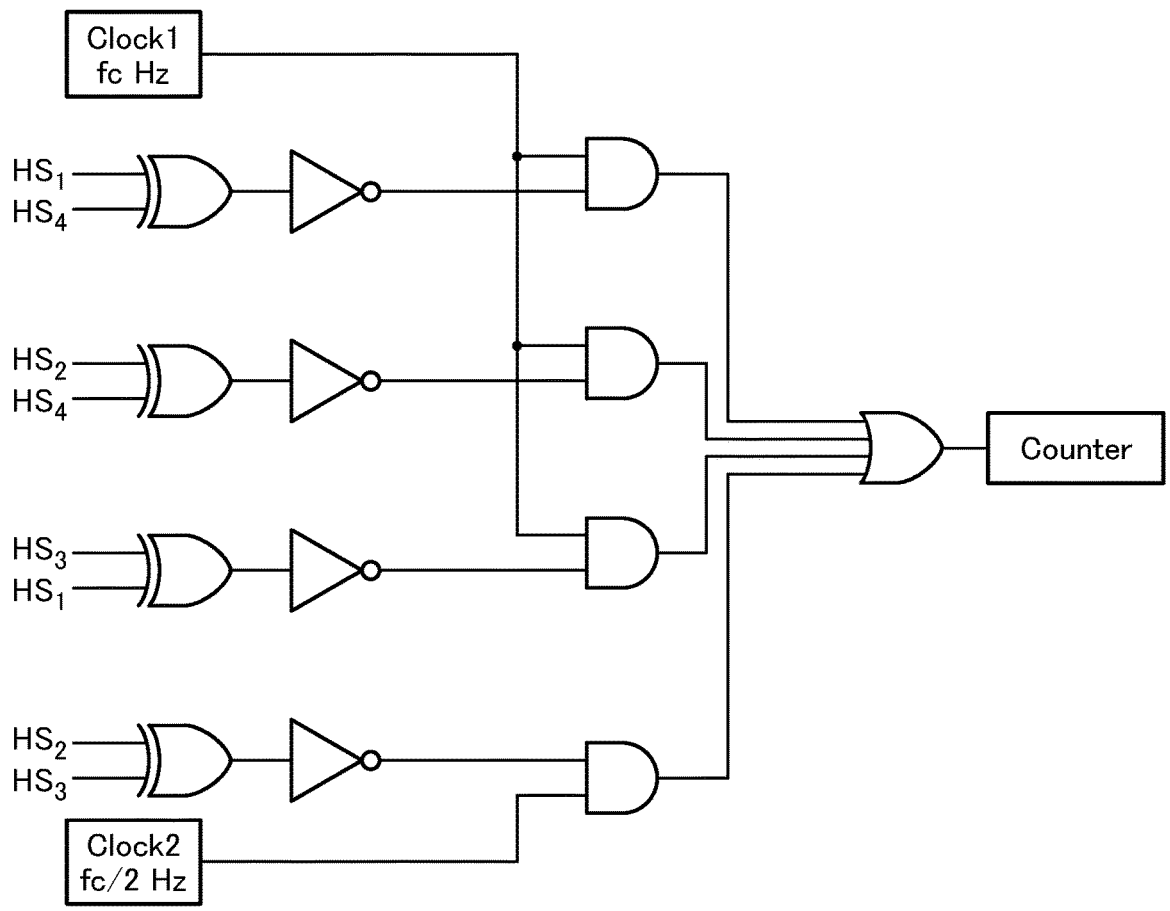
FIG. 18 is a diagram illustrating values of the output signals of Hall sensors $HS_1$, $HS_2$, $HS_3$, and $HS_4$ and the output of the section determination unit with respect to the rotor rotation phase angle.
FIG. 19 is a diagram illustrating an exemplary circuit configuration of a section determination unit and a clock pulse output unit according to the second embodiment of the motor rotation speed detection device.

From FIG. 18, since phase intervals L1, L2, and L4 of respective sections B11, B21, B41, B12, B22, and B42 are 1 when the angle 36° is the basic unit and phase interval L3 of respective sections B31 and B32 is 2 when the angle 36° is the basic unit, it is sufficient to prepare a first clock pulse generator for generating clock pulses of the frequency fc [Hz] and a second clock pulse generator for generating clock pulses of the frequency fc/2 [Hz]. FIG. 19 illustrates an exemplary circuit configuration adoptable in this case. FIG. 18 illustrates the output of the section determination unit 1011 in this case.

With such configurations, the rotational speed of the motor can be detected by a smaller number of Hall sensors than the number of phases of the motor.

The above-mentioned embodiments are not limited to the brushless motor, although they have been described with reference to the brushless motor. It is needless to say that they are applicable to any motor (e.g., a synchronous motor) that is similar to the brushless motor in configuration.

The motor rotation speed detection device may have any of the following constituent features 1 to 6.

1. A motor rotation speed detection device for an M-phase motor whose number of magnetic pole pairs is P, including first to Nth (N is an integer larger than 1 and smaller than M) Hall sensors disposed at intervals of an integral multiple of electrical angle 180/M°, a section determination unit configured to generate and output first to Nth signals in which only the i-th signal is a signal representing a first state and all the remaining signals are signals representing a second state that is different from the first state from the output signals of the first to Nth Hall sensors, in each of sections Bij (j is an integer not smaller than 1 and not larger than 2P) having a phase interval of (180/MP)·Li° (i is an integer not smaller than 1 and not larger than N, and Li is any integer not smaller than 1 and not larger than (M−N+1)), obtained by dividing each section obtained by dividing the phase section of one rotation of the M-phase motor into 2P pieces into N pieces, a clock pulse output unit configured to output clock pulses of frequency fc/Li in respective sections Bij when the i-th signal of the first to Nth signals is the signal representing the first state, a counter for counting the clock pulses output from the output unit for each section Bij, and a rotational speed calculation unit configured to calculate the rotational speed of the motor based on the counting value of the counter.

2. The motor rotation speed detection device according to the above-mentioned 1, wherein the clock pulse output unit includes first to K-th clock generators for generating clock pulses of first to K-th frequencies with respect to first to K-th frequencies mutually different among the frequency fc/Li, first to Nth operation units, and an OR operation unit, wherein the i-th operation unit outputs the output from the clock generator that generates clock pulses of the frequency fc/Li when the i-th signal is the signal representing the first state, and the OR operation unit calculates a logical sum of output signals of the first to Nth operation units and outputs clock pulses of the frequency fc/Li in each section Bi.

3. The motor rotation speed detection device according to the above-mentioned 2, wherein the first state is a first logic, the second state is a second logic different from the first logic, the first to Nth operation units are AND operation units, and the i-th operation unit calculates a logical product of the output from the clock generator that generates clock pulses of the frequency fc/Li and a logic represented by the i-th signal.

4. The motor rotation speed detection device according to the above-mentioned 1, wherein the clock pulse output unit includes a clock generator for generating clock pulses of frequency fc, and a clock frequency converter for multiplying the output of the clock generator by 1/Li when the i-th signal is the signal representing the first state and generating clock pulses of frequency fc/Li in each section Bij.

5. A motor rotation speed detection device for an M-phase motor whose number of magnetic pole pairs is P, including first to Nth (N is an integer larger than 1 and smaller than M) Hall sensors disposed at intervals of an integral multiple of electrical angle 180/M°, a section determination unit configured to generate and output first to Nth signals in which only the i-th signal is a signal representing a first state and all the remaining signals are signals representing a second state that is different from the first state from the output signals of the first to Nth Hall sensors, in each of sections Bij (j is an integer not smaller than 1 and not larger than 2P) having a phase interval of (180/MP)·Li° (i is an integer not smaller than 1 and not larger than N, and Li is any integer not smaller than 1 and not larger than (M−N+1)), obtained by dividing each section obtained by dividing the phase section of one rotation of the M-phase motor into 2P pieces into N pieces, a clock pulse output unit configured to output clock pulse of frequency fc, a counter for counting the clock pulses output from the output unit for each section Bij, and a rotational speed calculation unit configured to calculate the rotational speed of the motor based on a value obtained by multiplying the counting value of the counter by 1/Li, for each section Bij, when the i-th signal of the first to Nth signals is the signal representing the first state.

6. The motor rotation speed detection device according to any one of the above-mentioned 3 to 5, wherein P=1, M=3, N=2, and the section determination unit calculates an exclusive OR of the output signals of the first and second Hall sensors and a negation of the exclusive OR and then outputs the calculation results as first and second signals.

REFERENCE SIGNS LIST

1, 2, 3 reaction wheels
10, 20, 30 frames
101 third cutout part
102 fourth cutout part
103 third residual part
104 fourth residual part
105 female screw part 106 second through hole
107 recessed part
108 hole
109 opening
11 leaf spring
111 first slit
113 second slit
115 hole
116 ear part
12 electromagnet
121 first braking surface
122 wiring
13 flywheel (first flywheel)
131 recessed part
133 hole
134 second braking surface
135 screw hole
136 screw
14 motor
141 motor body
141a stator part
141b rotor part
143 shaft
144 wiring
18 connection member
4 rigid flexible substrate
40, 41, and 42 rigid circuit board parts
401, 411, and 421 first cutout parts
402, 412, and 422 second cutout parts
403, 413, and 423 first residual parts
404, 414, and 424 second residual parts
405, 415, and 425 first through openings
405a, 415a, and 425a nut accommodation parts
405b, 415b, and 425b screw accommodation parts
406, 416, and 526 first through holes
407, 417, and 427 fifth cutout parts
408, 418, and 428 openings
409, 419, and 429 terminals
45 and 46 flexible cables
5 reaction wheel apparatus
51 control unit
52 MEMS sensor IMU
7 expansion substrate
801, 802 nuts
811, 812, 813, and 814 screws
91, 92, 93', 94', 95', 98', 91", 92', 96', 97" connection assist member (motor rotation speed detection device)
$HS_1$, $HS_2$, $HS_3$, $HS_4$, $HS_N$ first to fourth and Nth Hall sensors
1001 motor rotation speed detection device
1011 section determination unit
1111 XOR element
1113 NOT element
1013 clock pulse output unit
$1131_1$, $1131_2$, $1131_j$, $1131_K$ first, second, j-th, and K-th clock pulse generator
$1133_1$, $1133_2$, $1133_3$, $1133_i$, $1133_N$ first, second, third, i-th, and Nth AND element
1135 OR element
1015 counter
1017 rotational speed calculation unit

The invention claimed is:

1. A reaction wheel apparatus including a reaction wheel provided in a polyhedral housing, wherein respective faces constituting a polyhedron are constituted by frames corresponding to the respective faces constituting the polyhedron, and at least two rigid circuit boards of a rigid-flex substrate are used as at least two of the frames, respectively, and wherein a part of the reaction wheel is used as part of one of the frames and is connected to a face of the one frame, wherein the one frame is not any of the at least two of the frames.

2. The reaction wheel apparatus according to claim 1, wherein the rigid-flex substrate includes a first rigid circuit board,
the first rigid circuit board of the rigid-flex substrate has a first through opening penetrating in the thickness direction of the first rigid circuit board,
the first through opening has a nut accommodation extending substantially parallel to a side edge of the first rigid circuit board and a screw accommodation that opens to the side edge of the first rigid circuit board and extends orthogonally to the nut accommodation,
a nut is accommodated in the nut accommodation,
at least one first frame neighboring the first rigid circuit board has a through hole at a position aligned with the screw accommodation of the first through opening of the first rigid circuit board and the nut accommodated in the nut accommodation, and
the at least one first rigid circuit board and the at least first frame are connected by driving the screw inserted from the outside of the at least one first frame into the nut through the through hole and the screw accommodation.

3. The reaction wheel apparatus according to claim 1, wherein
a cutout is formed at a side edge of at least one rigid circuit board of the rigid-flex substrate,
one of the frames connected to the side edge formed with the cutout is disposed so as to cover an opening edge of the cutout, in such a way as to form an opening between the one frame connected to the side edge formed with the cutout and the cutout, and
a wiring from a component provided inside the housing is connected to a terminal provided on an outer surface of the at least one rigid circuit board, through the opening.

4. The reaction wheel apparatus according to claim 1, wherein
a stepped cutout is formed at least one side edge of the rigid-flex substrate where a flexible cable is connected, of at least one rigid circuit board of the rigid-flex substrate, and
the flexible cable extends from a deeper region of the stepped cutout.

5. The reaction wheel apparatus according to claim 1, wherein a connection assist member to which an external device can be connected is attached to at least one vertex region or side region of the polyhedron.

6. The reaction wheel apparatus according to claim 1, wherein the reaction wheel includes
a rotary body disposed so as to face the one frame,
an electromagnet disposed between the one frame and the rotary body, and
a spring attached to the one frame and urging the electromagnet toward the one frame,
wherein at least a partial portion of the rotary body facing the electromagnet is formed of a ferromagnetic material,
the electromagnet is urged by the spring in such a manner that the electromagnet and the rotary body are separated from each other when the electromagnet is not energized, and
the electromagnet comes into contact with the rotary body against an urging force of the spring when the electromagnet is energized, thereby braking the rotary body.

7. The reaction wheel apparatus according to claim 6, wherein a motor for rotating the rotary body is disposed between the rotary body and the one frame, and a wiring from the motor is drawn out between the spring and the one frame.

8. The reaction wheel apparatus according to claim 1, wherein the polyhedron is a hexahedron.

9. The reaction wheel apparatus according to claim 3, wherein the component provided inside the housing is an electromagnet of the reaction wheel.

* * * * *